United States Patent
Teramoto et al.

(10) Patent No.: US 9,944,807 B2
(45) Date of Patent: Apr. 17, 2018

(54) INK COMPOSITION AND INK SET

(71) Applicant: Seiko Epson Corporation, Tokyo (JP)

(72) Inventors: Ryosuke Teramoto, Matsumoto (JP); Hiromi Ohori, Gifu (JP); Yuho Miyake, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 227 days.

(21) Appl. No.: 15/063,066

(22) Filed: Mar. 7, 2016

(65) Prior Publication Data

US 2016/0257832 A1 Sep. 8, 2016

(30) Foreign Application Priority Data

Mar. 6, 2015 (JP) .................. 2015-045214

(51) Int. Cl.
*C09D 11/328* (2014.01)
*C09D 11/38* (2014.01)
*C09D 11/40* (2014.01)

(52) U.S. Cl.
CPC ............ *C09D 11/328* (2013.01); *C09D 11/38* (2013.01); *C09D 11/40* (2013.01)

(58) Field of Classification Search
CPC ........ C09D 11/328; C09D 11/38; C09D 11/40
USPC ............... 106/31.48, 31.49, 31.58, 31.59
See application file for complete search history.

(56) References Cited

U.S. PATENT DOCUMENTS

| | | | | |
|---|---|---|---|---|
| 5,560,771 A * | 10/1996 | Takemoto | ............ | C09D 11/38 106/31.49 |
| 6,051,057 A * | 4/2000 | Yatake | ................... | C09D 11/30 106/31.58 |
| 6,786,571 B2 * | 9/2004 | Fukumoto | ............. | C09D 11/40 347/100 |
| 9,587,129 B2 * | 3/2017 | Miyake | ................ | C09D 11/328 |
| 9,676,951 B2 * | 6/2017 | Miyake | ................ | C09D 11/328 |
| 9,822,268 B2 * | 11/2017 | Ohori | ................... | C09D 11/328 |
| 2004/0129172 A1 * | 7/2004 | Harada | ................ | C09D 11/328 106/31.48 |
| 2006/0132810 A1 | 6/2006 | Hamajima et al. | | |
| 2007/0266887 A1 | 11/2007 | Koganehira et al. | | |
| 2007/0283845 A1 * | 12/2007 | Mizusaki | ............... | C09D 11/38 106/31.58 |
| 2012/0320124 A1 * | 12/2012 | Saito | ...................... | C09D 11/40 347/21 |
| 2013/0284064 A1 * | 10/2013 | Tateishi | ............... | C09D 11/328 106/31.78 |
| 2014/0218451 A1 * | 8/2014 | Iseki | .................... | C09D 11/328 106/31.58 |
| 2014/0364548 A1 * | 12/2014 | Everhardus | ............ | C09D 11/38 524/166 |
| 2015/0085034 A1 * | 3/2015 | Aruga | .................... | C09D 11/38 106/31.13 |
| 2015/0175825 A1 * | 6/2015 | Yamazaki | ............... | C09D 11/38 106/31.77 |
| 2016/0032125 A1 * | 2/2016 | Ohori | ................... | C09D 11/328 106/31.48 |
| 2016/0122565 A1 * | 5/2016 | Teramoto | ............... | C09D 11/38 106/31.48 |
| 2016/0137861 A1 * | 5/2016 | Tyvoll | ................... | C09D 11/38 347/56 |

FOREIGN PATENT DOCUMENTS

| | | | |
|---|---|---|---|
| JP | 2006-176605 A | | 7/2006 |
| JP | 5115695 B2 | | 1/2013 |
| JP | 2013224371 A | * | 10/2013 |

* cited by examiner

*Primary Examiner* — Helene Klemanski
(74) *Attorney, Agent, or Firm* — Nutter McClennen & Fish LLP; John J. Penny, Jr.

(57) ABSTRACT

There is provided an ink composition, including: a dye (M-2); a dye (Y-1); an alkylene oxide adduct of acetylene glycol having a main chain of 12 or more carbon atoms; acetylene glycol having a main chain of 10 or more carbon atoms; and a polyoxyalkylene alkyl ether, in which the content ratio A of the dye (M-2) and the dye (Y-1) (the dye (M-2):the dye (Y-1)) is 1.25:1 to 4.75:1.

16 Claims, No Drawings

INK COMPOSITION AND INK SET

BACKGROUND

1. Technical Field

The present invention relates to an ink composition and an ink set.

2. Related Art

Ink jet recording methods have been rapidly developed in many areas because high-definition images can be recorded by a comparatively simple device. Among these, various studies have been made about the quality of the recorded product. For example, JP-A-2006-176605 discloses an aqueous ink set for ink jet recording, including a magenta ink and a red ink, in which the lightness index (L*) of the magenta ink in the L*a*b* color system satisfies L* 50, which is a light magenta ink, for the purpose of reducing the graininess in a low-density printing unit containing a magenta color while minimizing the number of inks constituting an ink set without reducing the color reproduction range of red and magenta directions in a high-density printing unit and improving the clearness of an image by enlarging the color reproduction range of a red direction, and, if necessary, for the purpose of enlarging the color reproduction range of a blue or green direction by reducing the graininess in a low-density printing unit containing a cyan color while minimizing the number of inks constituting an ink set without reducing the color reproduction range of blue, green and cyan directions in a high-density printing unit.

However, the ink set disclosed in JP-A-2006-176605 has a problem of having insufficient color reproducibility.

Meanwhile, an ink composition is used with filing an ink container, such as a cartridge, a pack, or a large-capacity tank. However, with the expansion in intended use of such an ink, an ink composition excellent in high reliability (initial filling properties) in addition to the above color reproducibility is desired.

SUMMARY

An advantage of some aspects of the invention is to provide an ink composition excellent in color reproducibility and initial filling properties, and an ink set including the ink composition.

The present inventors have made efforts to solve the above-mentioned problems. As a result, the present inventors have found that these problems can be solved by using a predetermined amount of a predetermined dye. Based on this finding, the invention has been completed.

That is, the invention is as follows.

[1] According to an aspect of the present invention, there is provided an ink composition, including: a dye (M-2) represented by Formula (M-2); a dye (Y-1) represented by Formula (Y-1); an alkylene oxide adduct of acetylene glycol having a main chain of 12 or more carbon atoms; acetylene glycol having a main chain of 10 or more carbon atoms; and a polyoxyalkylene alkyl ether, in which the content ratio A of the dye (M-2) and the dye (Y-1) (the dye (M-2):the dye (Y-1)) is 1.25:1 to 4.75:1.

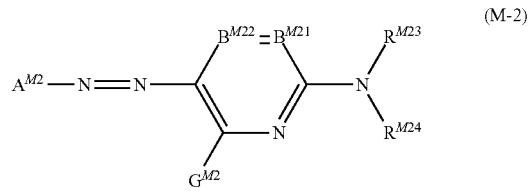

(In the formula (M-2), $A^{M2}$ represents a 5-membered heterocyclic group; each of $B^{M21}$ and $B^{M22}$ represents $-CR^{M21}=$ or $-CR^{M22}=$, or any one of $B^{M21}$ and $B^{M22}$ represents a nitrogen atom and the other thereof represents $-CR^{M21}=$ or $-CR^{M22}=$; $R^{M23}$ and $R^{M24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and may further have a substituent; $G^{M2}$, $R^{M21}$, and $B^{M22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, carbamoyloxy group, heterocyclic oxy group, an alkoxycarbonyloxy group, an aryloxycarbonyloxy group, an amino group substituted with an alkyl group, aryl group or heterocyclic group, an acylamino group, a ureido group, a sulfamoylamino group, an alkoxycarbonylamino group, an aryloxycarbonylamino group, an alkyl- or aryl-sulfonylamino group, a nitro group, an alkyl- or aryl-thio group, an alkyl- or aryl-sulfonyl group, an alkyl- or aryl-sulfinyl group, a sulfamoyl group, a sulfo group, or a heterocyclic thio group, and may be further substituted; and $R^{M21}$ and $R^{M23}$ or $R^{M23}$ and $R^{M24}$ may be bound to form a 5- or 6-membered ring.)

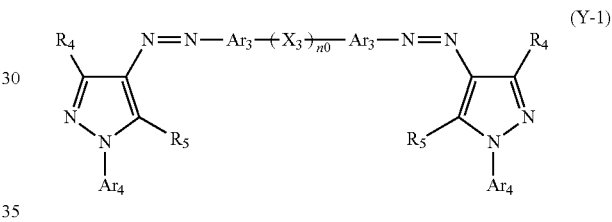

(In the formula (Y-1), $R_4$ represents a substituent; $R_5$ represents $-OR_6$ or $-NHR_7$ (each of $R_6$ and $R_7$ represents a hydrogen atom or a substituent); $X_3$ represents a divalent linking group; n0 is 0 or 1; $Ar_3$ represents a divalent heterocyclic group; and $Ar_4$ represents an alkyl group, an aryl group, or a triazine group.)

[2] In the ink composition according to [1], the dynamic contact angle of the ink composition to a silicon wafer may be 24° or less in 100 msec after dropping, and may be 9° or less in 5100 msec after dropping.

[3] The ink composition according to [1] or [2] may further include: a triethylene glycol alkyl ether.

[4] In the ink composition according to [3], the mass ratio of the triethylene glycol alkyl ether to the polyoxyalkylene alkyl ether may be 2 or more.

[5] In the ink composition according to any one of [1] to [4], the content of the polyoxyalkylene alkyl ether may be 1.0 mass % to 5.0 mass %.

[6] In the ink composition according to any one of [3] to [5], the content of the triethylene glycol alkyl ether may be 3.0 mass % to 15 mass %.

[7] In the ink composition according to any one of [3] to [6], the triethylene glycol alkyl ether may include a triethylene glycol monobutyl ether.

[8] In the ink composition according to any one of [1] to [7], the total content of the dye (M-2) and the dye (Y-1) may be 2.0 mass % to 10.0 mass %.

[9] According to another aspect of the present invention, there is provided an ink set, including: the ink composition according to any one of [1] to [8]; and at least one selected from the group consisting of a yellow ink composition, a magenta ink composition, a cyan ink composition, and a black ink composition.

DESCRIPTION OF EXEMPLARY EMBODIMENTS

Hereinafter, an embodiment of the invention (hereinafter, referred to as "present embodiment") will be described in detail, but the invention is not limited thereto. Various modifications can be made within the scope not departing from the gist thereof.

Ink Composition

The ink composition according to the present embodiment includes: a dye (M-2) represented by Formula (M-2); a dye (Y-1) represented by Formula (Y-1); an alkylene oxide adduct of acetylene glycol having a main chain of 12 or more carbon atoms; acetylene glycol having a main chain of 10 or more carbon atoms; and a polyoxyalkylene alkyl ether, in which the content ratio A of the dye (M-2) and the dye (Y-1) (the dye (M-2):the dye (Y-1)) is 1.25:1 to 4.75:1.

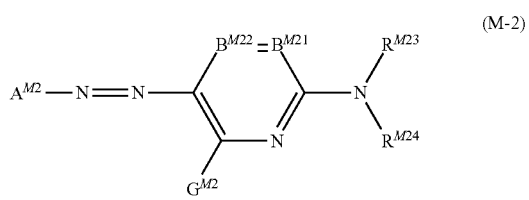

(M-2)

(In the formula (M-2), $A^{M2}$ represents a 5-membered heterocyclic group; each of $B^{M21}$ and $B^{M22}$ represents —$CR^{M21}$= or —$CR^{M22}$=, or any one of $B^{M21}$ and $B^{M22}$ represents a nitrogen atom and the other thereof represents —$CR^{M21}$= or —$CR^{M22}$=; $R^{M23}$ and $R^{M24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and may further have a substituent; $G^{M2}$, $R^{M21}$, and $R^{M22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, carbamoyloxy group, heterocyclic oxy group, an alkoxycarbonyloxy group, an aryloxycarbonyloxy group, an amino group substituted with an alkyl group, aryl group or heterocyclic group, an acylamino group, a ureido group, a sulfamoylamino group, an alkoxycarbonylamino group, an aryloxycarbonylamino group, an alkyl- or aryl-sulfonylamino group, an aryloxycarbonylamino group, a nitro group, an alkyl- or aryl-thio group, an alkyl- or aryl-sulfonyl group, an alkyl- or aryl-sulfinyl group, a sulfamoyl group, a sulfo group, or a heterocyclic thio group, and may be further substituted; and $R^{M21}$ and $R^{M23}$ or $R^{M23}$ and $R^{M24}$ may be bound to form a 5- or 6-membered ring.)

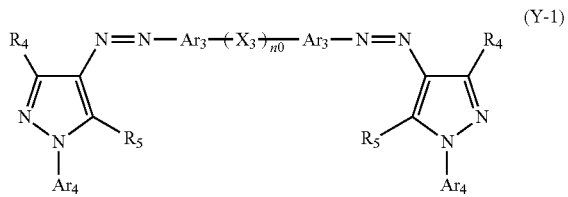

(Y-1)

(In the formula Y-1, $R_4$ represents a substituent; $R_5$ represents —$OR_6$ or —$NHR_7$ (each of $R_6$ and $R_7$ represents a hydrogen atom or a substituent); $X_3$ represents a divalent linking group; n0 is 0 or 1; $Ar_3$ represents a divalent heterocyclic group; and $Ar_4$ represents an alkyl group, an aryl group, or a triazine group.)

Substituent Group A

First, substituent group A and ionic hydrophilic group are defined.

Examples of the substituent group A include, but are not particularly limited to, a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonyl group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinyl amino group, a silyl group, a sulfonamide group, and an ionic hydrophilic group. These substituents may be further substituted, and the further substituent group may be a group selected from the above-described substituent group A.

More specifically, examples of the halogen atom include a fluorine atom, a chlorine atom, a bromine atom, and iodine atom.

As the alkyl group, a linear, branched or cyclic substituted or unsubstituted alkyl group is exemplified. The alkyl group includes a cycloalkyl group, a bicycloalkyl group, cycloalkyl groups having many cyclic structures. The alkyl group among the substituents to be described later (for example, an alkoxy group, an alkyl group of an alkylthio group) represents an alkyl group of such a concept. Specifically, the alkyl group is preferably an alkyl group having 1 to 30 carbon atoms, such as a methyl group, an ethyl group, an n-propyl group, an i-propyl group, a t-butyl group, an n-octyl group, an eicosyl group, a 2-chloroethyl group, a 2-cyanoethyl group, or a 2-ethylhexyl group. The cycloalkyl group is preferably a substituted or unsubstituted cycloalkyl group having 3 to 30 carbon atoms, such as a cyclohexyl group, a cyclopentyl group, or a 4-n-dodecyl cyclohexyl group. The bicycloalkyl group is preferably a substituted or unsubstituted bicycloalkyl group having 5 to 30 carbon atoms, that is, a monovalent group obtained by removing one hydrogen atom from a bicycloalkane having 5 to 30 carbon atoms, such as a bicyclo [1,2,2] heptane-2-yl group or a bicyclo [2,2,2] octane-3-yl group.

As the aralkyl group, a substituted or unsubstituted aralkyl group is exemplified. The substituted or unsubstituted aralkyl group is preferably an aralkyl group having 7 to 30 carbon atoms. Examples thereof include a benzyl group and a 2-phenethyl group.

As the alkenyl group, a linear, branched or cyclic substituted or unsubstituted alkenyl group is exemplified. The alkenyl group includes a cycloalkenyl group and a bicycloalkenyl group. Specifically, the alkenyl group is preferably an alkenyl group having 2 to 30 carbon atoms, such as a vinyl group, an allyl group, a prenyl group, a geranyl group, or an oleyl group. The cycloalkenyl group is preferably a substituted or unsubstituted cycloalkenyl group having 3 to 30 carbon atoms, that is, a monovalent group obtained by removing one hydrogen atom from a cycloalkene having 3 to 30 carbon atoms, such as a 2-cyclopentene-1-yl group or a 2-cyclohexen-1-yl. The bicycloalkenyl group is a substituted or unsubstituted bicycloalkenyl group, and preferably a substituted or unsubstituted bicycloalkenyl group having 5 to 30 carbon atoms, that is, a monovalent group obtained by removing one hydrogen atom from a bicycloalkene having one double bond, such as a bicyclo[2,2,1]hept-2-en-1-yl group or a bicyclo[2,2,2]oct-2-en-4-yl group.

The alkynyl group is preferably a substituted or unsubstituted alkynyl group having 2 to 30 carbon atoms, such as an ethynyl group, a propargyl group, or a trimethylsilylethynyl group.

The aryl group is preferably a substituted or unsubstituted aryl group having 6 to 30 carbon atoms, such as a phenyl group, p-tolyl group, a naphthyl group, an m-chlorophenyl group, or an o-hexadecanoylaminophenyl group.

The heterocyclic group is preferably a monovalent group obtained by removing one hydrogen atom from a 5- or 6-membered substituted or unsubstituted aromatic or nonaromatic heterocyclic compound, and further preferably a 5-membered or 6-membered aromatic heterocyclic group having 3 to 30 carbon atoms, such as a 2-furyl group, a 2-thienyl group, a 2-pyrimidinyl group, or a 2-benzothiazolyl group.

The alkoxy group is preferably a substituted or unsubstituted alkoxy group having 1 to 30 carbon atoms, such as a methoxy group, an ethoxy group, an isopropoxy group, a t-butoxy group, an n-octyl group, or a 2-methoxyethoxy group.

The aryloxy group is preferably a substituted or unsubstituted aryloxy group having 6 to 30 carbon atoms, such as a phenoxy group, a 2-methylphenoxy group, 4-t-butylphenoxy group, a 3-nitrophenoxy group, or a 2-tetradecanoylaminophenoxy group.

The silyloxy group is preferably a substituted or unsubstituted silyloxy group having 0 to 20 carbon atoms, such as a trimethyl silyloxy group or a diphenylmethyl silyloxy group.

The heterocyclic oxy group is preferably a substituted or unsubstituted heterocyclic oxy group having 2 to 30 carbon atoms, such as a 1-phenyl-tetrazole-5-oxy group or a 2-tetrahydropyranyl group.

The acyloxy group is preferably a formyloxy group, a substituted or unsubstituted alkylcarbonyloxy group having 2 to 30 carbon atoms, or a substituted or unsubstituted arylcarbonyloxy group having 6 to 30 carbon atoms such as an acetyloxy group, a pivaloyloxy group, a stearoyloxy group, a benzoyloxy group, or a p-methoxyphenyl carbonyloxy group.

The carbamoyloxy group is preferably a substituted or unsubstituted carbamoyloxy group having 1 to 30 carbon atoms, such as an N,N-dimethylcarbamoyl group, an N,N-diethylcarbamoyl group, a morpholino carbonyloxy group, an N,N-di-n-octylaminocarbonyloxy group, or an N-n-octylcarbamoyloxy group.

The alkoxycarbonyloxy group is preferably a substituted or unsubstituted alkoxycarbonyloxy group having 2 to 30 carbon atoms, such as a methoxycarbonyloxy group, an ethoxycarbonyloxy group, a t-butoxycarbonyloxy group, or an n-octylcarbonyloxy group.

The aryloxycarbonyloxy group is preferably a substituted or unsubstituted aryloxycarbonyloxy group having 7 to 30 carbon atoms, such as a phenoxycarbonyloxy group, a p-methoxyphenoxycarbonyloxy group, or a p-n-hexadecyloxyphenoxycarbonyloxy group.

The amino group includes an alkylamino group, an arylamino group, a heterocyclic amino group. The amino group is preferably an amino group, a substituted or unsubstituted alkyamino group having 1 to 30 carbon atoms, or a substituted or unsubstituted anilino group having 6 to 30 carbon atoms such as a methylamino group, a dimethylamino group, an anilino group, an N-methyl-anilino group, a diphenylamino group, or triazinylamino group.

The acylamino group is preferably a formylamino group, a substituted or unsubstituted alkylcarbonylamino group having 1 to 30 carbon atoms, or a substituted or unsubstituted arylcarbonylamino group having 6 to 30 carbon atoms such as an acetylamino group, a pivaloylamino group, a lauroylamino group, a benzoylamino group, or 3,4,5-tri-n-octyloxyphenylcarbonylamino group.

The aminocarbonylamino group is preferably a substituted or unsubstituted aminocarbonylamino group having 1 to 30 carbon atoms, such as a carbamoylamino group, an N,N-dimethylaminocarbonylamino group, an N,N-diethylaminocarbonylamino group, or a morpholinocarbonylamino group.

The alkoxycarbonylamino group is preferably a substituted or unsubstituted alkoxycarbonylamino group having 2 to 30 carbon atoms, such as a methoxycarbonylamino group, an ethoxycarbonylamino group, a t-butoxycarbonylamino group, an n-octadecyloxycarbonylamino group, or an N-methylmethoxycarbonylamino group.

The aryloxycarbonylamino group is preferably a substituted or unsubstituted aryloxycarbonylamino group having 7 to 30 carbon atoms, such as a phenoxycarbonylamino group, a p-chlorophenoxycarbonylamino group, or an m-n-octyloxyphenoxycarbonylamino group.

The sulfamoylamino group is preferably a substituted or unsubstituted sulfamoylamino group having 0 to 30 carbon atoms, such as a sulfamoylamino group, an N,N-dimethylamino sulfonylamino group, an N-n-octylamino sulfonylamino group.

The alkyl- or aryl-sulfonylamino group is preferably a substituted or unsubstituted alkyl sulfonylamino group having 1 to 30 carbon atoms or a substituted or unsubstituted aryl sulfonylamino group having 6 to 30 carbon atoms, such as a methyl sulfonylamino group, a butyl sulfonylamino group, a phenyl sulfonylamino group, a 2,3,5-trichlorophenyl sulfonylamino group, or a p-methylphenyl sulfonylamino group.

The alkylthio group is preferably a substituted or unsubstituted alkylthio group having 1 to 30 carbon atoms, such as a methylthio group, an ethylthio group, or an n-hexadecylthio group.

The arylthio group is preferably a substituted or unsubstituted arylthio group having 6 to 30 carbon atoms, such as a phenylthio group, p-chlorophenylthio group, or an m-methoxyphenylthio group.

The heterocyclic thio group is preferably a substituted or unsubstituted heterocyclic thio group having 2 to 30 carbon atoms, such as a 2-benzothiazolylthio group or a 1-phenyltetrazole-5-ylthio group.

The sulfamoyl group is preferably a substituted or unsubstituted sulfamoyl group having 0 to 30 carbon atoms, such as an N-ethyl sulfamoyl group, an N-(3-dodecyloxypropyl) sulfamoyl group, an N,N-dimethyl sulfamoyl group, an N-acetyl sulfamoyl group, an N-benzoyl sulfamoyl group, or an N-(N'-phenylcarbamoyl) sulfamoyl group.

The alkyl- or aryl-sulfinyl group is preferably a substituted or unsubstituted alkyl sulfinyl group having 1 to 30 carbon atoms or a substituted or unsubstituted aryl sulfinyl group having 6 to 30 carbon atoms, such as a methyl sulfinyl group, an ethyl sulfinyl group, a phenyl sulfinyl group, a p-methyl phenyl sulfinyl group.

The alkyl- or aryl-sulfonyl group is preferably a substituted or unsubstituted alkylsulfonyl group having 1 to 30 carbon atoms or a substituted or unsubstituted arylsulfonyl group having 6 to 30 carbon atoms, such as a methyl sulfonyl group, an ethyl sulfonyl group, a phenyl sulfonyl group, a p-methyl phenyl sulfonyl group.

The acyl group is preferably a formyl group, a substituted or unsubstituted alkyl carbonyl group having 2 to 30 carbon atoms, a substituted or unsubstituted aryl carbonyl group having 7 to 30 carbon atoms, or a substituted or unsubstituted heterocyclic carbonyl group having 2 to 30 carbon atoms, in which a carbon atom is bonded with a carbonyl group, such as an acetyl group, a pivaloyl group, a 2-chloroacetyl group, a stearoyl group, a benzoyl group, a p-n-octyloxyphenylcarbonyl group, a 2-pyridylcarbonyl group, or 2-furylcarbonyl group.

The aryloxycarbonyl group is preferably a substituted or unsubstituted aryloxycarbonyl group having 7 to 30 carbon atoms, such as a phenoxycarbonyl group, an o-chlorophenoxycarbonyl group, an m-nitrophenoxycarbonyl group, or a p-t-butylphenoxcarbonyly group.

The alkoxycarbonyl group is preferably a substituted or unsubstituted alkoxycarbonyl group having 2 to 30 carbon atoms, such as a methoxycarbonyl group, an ethoxycarbonyl group, a t-butoxycarbonyl group, or an n-octadecyloxycarbonyl group.

The carbamoyl group is preferably a substituted or unsubstituted carbamoyl group having 1 to 30 carbon atoms, such as a carbamoyl group, an N-methylcarbamoyl group, an N,N-dimethylcarbamoyl group, an N,N-di-n-octylcarbamoyl group, or an N-(methylsulfonyl)carbamoyl group.

The aryl or heterocyclic azo group is preferably a substituted or unsubstituted aryl azo group having 6 to 30 carbon atoms or a substituted or unsubstituted heterocyclic azo group having 3 to 30 carbon atoms, such as a phenyl azo group, a p-chlorophenyl azo group, or a 5-ethylthio-1,3,4-thiadiazol-2-yl azo group.

The imide group is preferably an N-succinimide group or an N-phthalimide group.

The phosphino group is preferably a substituted or unsubstituted phosphino group having 0 to 30 carbon atoms, such as a dimethylphosphino group, a diphenylphosphino group, or a methylphenoxyphosphino group.

The phosphinyl group is preferably a substituted or unsubstituted phosphinyl group having 0 to 30 carbon atoms, such as a phosphinyl group, a dioctyloxy phosphinyl group, or a diethoxy phosphinyl group.

The phosphinyloxy group is preferably a substituted or unsubstituted phosphinyloxy group having 0 to 30 carbon atoms, such as a diphenoxy phosphinyloxy group or a dioctyloxy phosphinyloxy group.

The phosphinylamino group is preferably a substituted or unsubstituted phosphinylamino group having 0 to 30 carbon atoms, such as a dimethoxy phosphinylamino group or a dimethylamino phosphinylamino group.

The silyl group is preferably a substituted or unsubstituted silyl group having 0 to 30 carbon atoms, such as a trimethylsilyl group, a t-butyldimethylsilyl group, or a phenyldimethylsilyl group.

Ionic Hydrophilic Group

Examples of the ionic hydrophilic group include, but are not limited to, a sulfo group, a carboxyl group, a thiocarboxyl group, a sulfino group, a phosphono group, a dihydroxy phosphino group, and a quaternary ammonium group. Among these, a sulfo group and a carboxyl group are particularly preferable. The carboxyl group, phosphono group and sulfo group may be in the form of a salt. Here, examples of the counter cation forming the salt include ammonium ion, alkali metal ions (e.g., lithium ion, sodium ion, and potassium ion), and organic cations (e.g., tetramethylammonium ion, tetramethylguanidium ion, and tetramethylphosphonium ion). Examples of the salt include preferably a lithium salt, a sodium salt, a potassium salt, and an ammonium salt, further preferably a lithium salt and a mixed salt containing the lithium salt as a main component, and most preferably a lithium salt.

Dye (M-2) Represented by Formula (M-2)

Hereinafter, a dye (M-2) represented by the following Formula will be described in detail. The dye (M-2) represented by Formula (M-2) may form a salt.

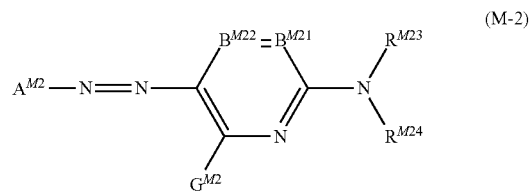

(M-2)

(In the formula (M-2), $A^{M2}$ represents a 5-membered heterocyclic group; each of $B^{M21}$ and $B^{M22}$ represents $-CR^{M21}=$ or $-CR^{M22}=$, or any one of $B^{M21}$ and $B^{M22}$ represents a nitrogen atom and the other thereof represents $-CR^{M21}=$ or $-CR^{M22}=$; $R^{M23}$ and $R^{M24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and may further have a substituent; $G^{M2}$, $R^{M21}$, and $B^{M22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, carbamoyloxy group, heterocyclic oxy group, an alkoxycarbonyloxy group, an aryloxycarbonyloxy group, an amino group substituted with an alkyl group, aryl group or heterocyclic group, an acylamino group, a ureido group, a sulfamoylamino group, an alkoxycarbonylamino group, an aryloxycarbonylamino group, an alkyl- or aryl-sulfonylamino group, an aryloxycarbonylamino group, a nitro group, an alkyl- or aryl-thio group, an alkyl- or aryl-sulfonyl group, an alkyl- or aryl-sulfinyl group, a sulfamoyl group, a sulfo group, or a heterocyclic thio group, and may be further substituted; and $R^{M21}$ and $R^{M23}$ or $R^{M23}$ and $R^{M24}$ may be bound to form a 5- or 6-membered ring.)

In the Formula (M-2), examples of the 5-membered heterocyclic group may include a pyrazole ring, an imidazole ring, a thiazole ring, an isothiazole ring, a thiadiazole ring, a benzothiazole ring, a benzoxazole ring, and a benzisothiazole ring. Each of the 5-membered heterocyclic groups may have a substituent. Among the heterocyclic rings, a pyrazole ring is preferable.

In the Formula (M-2), in $R^{M21}$, a hydrogen atom or an alkyl group is preferable, and a hydrogen atom is more preferable.

In the Formula (M-2), in $R^{M22}$, an aliphatic group is preferable, and a methyl group, an ethyl group, a propyl group which may be branched, or a butyl group which may be branched is more preferable.

In the Formula (M-2), $R^{M23}$ and $R^{M24}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. Each of $R^{M23}$ and $R^{M24}$ may further have a substituent.

In the Formula (M-2), in $R^{M23}$, an aromatic group is preferable, and specific examples thereof include a benzene ring group and a naphthalene ring group. In $R^{M24}$, a heterocyclic group is preferable, and a specific example thereof includes a benzothiazole ring group.

In the Formula (M-2), $G^{M2}$, $R^{M21}$, and $R^{M22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, carbamoyloxy group, heterocyclic oxy group, an alkoxycarbonyloxy group, an aryloxycarbonyloxy group, an amino group substituted with an alkyl group, aryl group or heterocyclic group, an acylamino group, a ureido group, a sulfamoylamino group, an alkoxycarbonylamino group, an aryloxycarbonylamino group, an alkyl- or aryl-sulfonylamino group, an aryloxycarbonylamino group, a nitro group, an alkyl- or aryl-thio group, an alkyl- or aryl-sulfonyl group, an alkyl- or aryl-sulfinyl group, a sulfamoyl group, a sulfo group, or a heterocyclic thio group. Each of $R^{M23}$ and $R^{M24}$ may be further substituted. $R^{M21}$ and $R^{M23}$ or $R^{M23}$ and $R^{M24}$ may be bound to form a 5- or 6-membered ring.

Among the color materials represented by Formula (M-2) above, a compound represented by Formula (M-21) below is preferable.

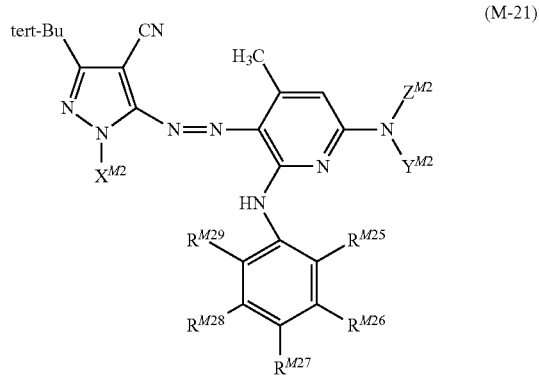

(M-21)

(In the Formula (M-21), $R^{M25}$, $R^{M26}$, $R^{M27}$, $R^{M28}$, and $R^{M29}$ each independently represent a hydrogen atom, an alkyl group, a sulfo group, or a salt thereof. In the Formula (M-21), when both $R^{M25}$ and $R^{M29}$ are alkyl groups, the total number of carbon atoms constituting the alkyl groups is 3 or more, and these alkyl groups may have a substituent. $X^{M2}$ represents a hydrogen atom, an aliphatic group, an aromatic group, or a heterocyclic group, and $Y^{M2}$ and $Z^{M2}$ each represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. Each of the groups may further have a substituent. When a sulfo group is included in each of $R^{M25}$ to $R^{M29}$, it has a form of —SO$_3$M. In this case, M is preferably an alkali metal atom, and more preferably at least one of Li and Na.)

In the Formula (M-21), in $X^{M2}$, particularly, an aromatic group, an alicyclic group, or a heterocyclic group is preferable. Specific examples thereof include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring, and a thiane ring. Among these, a heterocyclic ring is more preferable.

In the Formula (M-21), preferable specific examples of $Y^{M2}$ and $Z^{M2}$ are the same as the preferable specific examples of $R^{M3}$ and $R^{M24}$ in the dye (M-2).

Among the compounds represented by the Formula (M-21), a compound represented by Formula (M-22) below is particularly preferable in terms of excellent color developing properties and ozone resistance.

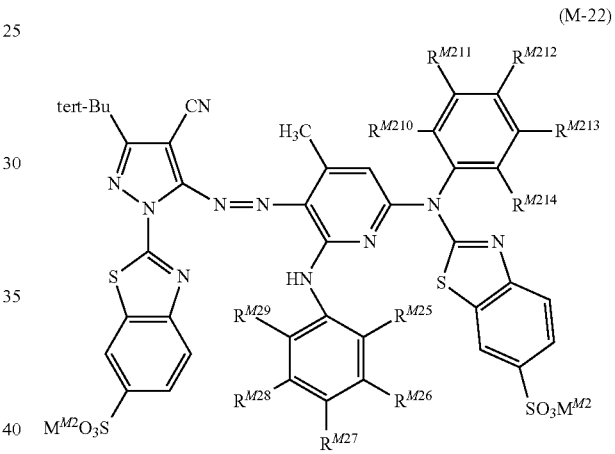

(M-22)

(In the Formula (M-22), $R^{M25}$, $R^{M26}$, $R^{M27}$, $R^{M28}$, $R^{M29}$, $R^{M210}$, $R^{M211}$, $R^{M212}$, $R^{M213}$, and $R^{M214}$ each independently represent a hydrogen atom, an alkyl group, a sulfo group, or a salt thereof, and $M^{M2}$ represents a hydrogen atom or an alkali metal atom. When both $R^{M25}$ and $R^{M29}$ are alkyl groups, the total number of carbon atoms constituting the alkyl groups is 3 or more, and these alkyl groups may have a substituent. When both $R^{M210}$ and $R^{M214}$ are alkyl groups, the total number of carbon atoms constituting the alkyl groups is 3 or more, and these alkyl groups may have a substituent.)

The content of the dye (M-2) is preferably 1.5 mass % to 7.5 mass %, more preferably 2.5 mass % to 6.5 mass %, and further preferably 3.0 mass % to 6.0 mass %, with respect to the total amount of the ink composition. When the content of the dye (M-2) is within the above range, an image having more excellent color reproducibility can be obtained, and initial filling properties also tend to be excellent.

The content ratio A of the dye (M-2) and the dye (Y-1) (the dye (M-2):the dye (Y-1)) is 1.25:1 to 4.75:1, more preferably 1.5:1 to 4.5:1, and further preferably 1.75:1 to 4.25:1. When the content ratio A thereof is within the above range, an image having more excellent color reproducibility can be obtained, and initial filling properties also tend to be excellent.

The total content of the dye (M-2) and the dye (Y-1) is preferably 2.0 mass % to 10.0 mass %, more preferably 3.0 mass % to 9.0 mass %, and further preferably 4.0 mass % to 8.0 mass %, with respect to the total amount of the ink composition. When the total content of the dye (M-2) and the dye (Y-1) is within the above range, an image having more excellent color reproducibility can be obtained, and initial filling properties also tend to be excellent.

The ink composition, for adjustment of color tone, may contain a magenta dye other than the above components within the range not greatly deteriorating the characteristics including light resistance.

Dye (Y-1) Represented by Formula (Y-1)

Hereinafter, a dye (Y-1) represented by Formula (Y-1) will be described.

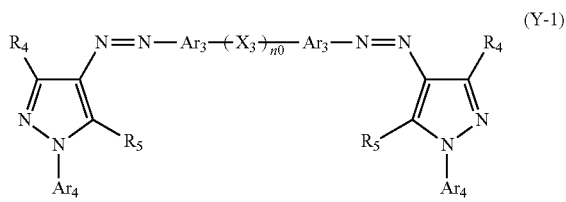

(In the formula (Y-1), $R_4$ represents a substituent; $R_5$ represents —$OR_6$ or —$NHR_7$ (each of $R_6$ and $R_7$ represents a hydrogen atom or a substituent); $X_3$ represents a divalent linking group; n0 is 0 or 1; $Ar_3$ represents a divalent heterocyclic group; and $Ar_4$ represents an alkyl group, an aryl group, or a triazine group.)

In the formula (Y-1), the divalent heterocyclic group represented by $Ar_3$ is preferably a 5- or 6-membered ring, and the 5- or 6-membered ring may be further condensed. Further, the divalent heterocyclic group may be an aromatic heterocyclic ring or a non-aromatic heterocyclic ring. Examples of the divalent heterocyclic group represented by $Ar_3$ include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, and thiazoline. Among these, an aromatic heterocyclic group is preferable, and preferable examples thereof include pyridine, pyrazine, pyrimidine, pyridazine, triazine, pyrazole, imidazole, benzimidazole, triazole, thiazole, benzothiazole, isothiazole, benzisothiazole, and thiadiazole. Thiadiazole is most preferable. They may have a substituent, and examples of the substituent are the same as the above-described substituent group A.

In the formula (Y-1), the substituents represented by $R_4$, $R_6$, and $R_7$ are selected from the substituent group A.

In the formula (Y-1), $R_4$ is an alkyl group, an alkoxy group, or an aryl group, preferably an alkyl group having 1 to 4 carbon atoms, more preferably a methyl group, an ethyl group, a tertiary butyl group, a phenyl group, a methoxy group, or an ethoxy group, and further preferably a tertiary butyl group.

In the formula (Y-1), $R_5$ is preferably a substituted or unsubstituted amino group, and more preferably an unsubstituted amino group.

In the formula (Y-1), $Ar_4$ is preferably a substituted or unsubstituted aryl group, and further preferably a substituted or unsubstituted phenyl group.

In the formula (Y-1), when each of $R_4$, $R_5$, and $Ar_4$ further have a substituent, the substituent is selected from the substituent group A, and is preferably an alkyl group, an aryl group, a heterocyclic group, a cyano group, a hydroxyl group, a nitro group, or an alkoxy group, and further preferably an alkyl group, an aryl group, or a heterocyclic group.

In the formula (Y-1), the divalent linking group represented by $X_3$ is preferably an alkylene group (e.g., methylene, ethylene, propylene, butylene, or pentylene), an alkenylene group (e.g., ethenylene or propenylene), an alkynylene group (e.g., ethynylene or propynylene), an arylene group (e.g., phenylene or naphthylene), a divalent heterocyclic group (e.g., a 6-chloro-1,3,5-triazine-2,4-diyl group, a pyrimidine-2,4-diyl group, or a quinoxaline-2,3-diyl group), —O—, —CO—, —$NR_4$— ($R_4$ is a hydrogen atom, an alkyl group, or an aryl group), —S—, —$SO_2$—, —SO— or a combination thereof.

In the formula (Y-1), the alkylene group, the alkenylene group, the alkynylene group, the divalent heterocyclic group, or the alkyl or aryl group represented by $R_4$, each of which is represented by $X_3$, may have a substituent. Examples of the substituent are the same as the above-described examples thereof. The alkyl or aryl group represented by $R_4$ includes a substituted or unsubstituted alkyl or aryl group. The substituted or unsubstituted alkyl group is preferably an alkyl group having 1 to 30 carbon atoms, and the substituted or unsubstituted aryl group is preferably an aryl group having 6 to 30 carbon atoms.

In the formula (Y-1), in the divalent linking group represented by $X_3$, an alkylene group having 10 or less carbon atoms, an alkenylene group having 10 or less carbon atoms, an alkynylene group having 10 or less carbon atoms, an arylene group having 6 to 10 carbon atoms, a divalent heterocyclic group, —O—, —S—, or a combination thereof is more preferable, and an alkylene group, —S—, or a combination thereof is further preferable.

The number of total carbon atoms of the divalent linking group is preferably 0 to 50, more preferably 0 to 30, and most preferably 0 to 10.

In the formula (Y-1), the aryl group or arylene group represented by $AR_4$ is preferably the same as the above-described aryl group or arylene group represented by $R_4$. Further, the triazine group represented by $AR_4$ may have a monovalnet substituent (the monovalent substituent is preferably the same as the above-described substituent group A).

The color material represented by Formula (Y-1) is not particularly limited. For example, the color material is preferably a compound represented by Formula (Y-1-1) below, and more preferably a compound represented by Formula (Y-1-2) below.

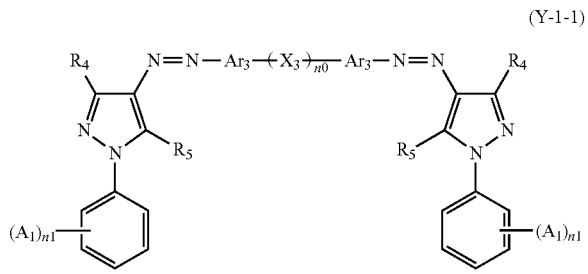

(In the formula (Y-1-1), $R_4$ represents a substituent; $R_5$ represents —$OR_6$ or $NHR_7$, and each of $R_6$ and $R_7$ represents a hydrogen atom or a substituent; $X_3$ represents a divalent linking group; n0 is 0 or 1; $Ar_3$ represents a divalent heterocyclic group; $A_1$ represents an ionic hydrophilic group; and n1 represents 0 to 2.)

$R_4$, $R_5$, $Ar_3$, n0, and $X_3$ in the formula (Y-1-1) are preferably the same as $R_4$, $R_5$, $Ar_3$, n0, and $X_3$ in the formula (Y-1).

In the formula (Y-1-1), the ionic hydrophilic group represented by $A_1$ is preferably —$SO_3M$ or —$CO_2M$, more preferably —$SO_3M$, and particularly preferably —$CO_2K$. M's each independently a hydrogen atom or a monovalent counter cation. Examples of the monovalent counter cation include ammonium ion, alkali metal ions (e.g., lithium ion, sodium ion, and potassium ion), and organic cations (e.g., tetramethylammonium ion, tetramethylguanidium ion, and tetramethylphosphonium ion). Examples of the salt include preferably a lithium salt, a sodium salt, a potassium salt, and an ammonium salt, further preferably a lithium salt and a mixed salt containing the lithium salt as a main component, and most preferably a lithium salt.

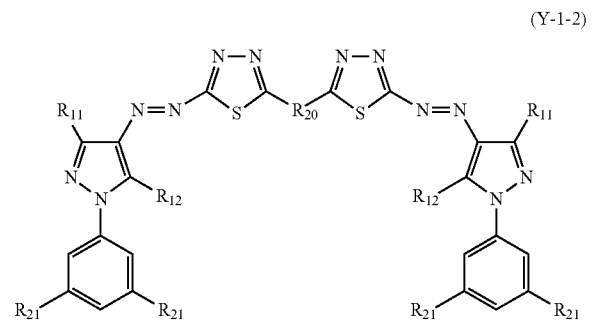

(Y-1-2)

(In the formula (Y-1-2), $R_{20}$ represents an alkylene group, —S—, or a linking group obtained by a combination thereof; $R_{21}$ represents an ionic hydrophilic group; $R_{11}$ represents an alkyl group; and $R_{12}$ represents an amino group.)

In the formula (Y-1-2), $R_{20}$ is preferably an alkylene group which is the same as the alkylene group in the divalent linking group represented by $X_3$ of Formula (Y-1).

In the formula (Y-1-2), $R_{21}$ represents a carboxyl group (—$CO_2M$). M's each independently a hydrogen atom or a monovalent counter cation. Examples of the monovalent counter cation include ammonium ion, alkali metal ions (e.g., lithium ion, sodium ion, and potassium ion), and organic cations (e.g., tetramethylammonium ion, tetramethylguanidium ion, and tetramethylphosphonium ion). Examples of the salt include preferably a lithium salt, a sodium salt, a potassium salt, and an ammonium salt, further preferably a lithium salt and a mixed salt containing the lithium salt as a main component, and most preferably a lithium salt.

In the formula (Y-1-2), preferably, the alkyl group represented by $R_{11}$ and the amino group represented by $R_{12}$ are respectively the same as the alkyl group and amino group represented by $R_4$ and $R_5$ of Formula (Y-1).

Specific examples of the compound represented by Formula (Y-1) are shown below, but the compound used in the present embodiment is not limited to the following examples. In specific examples, Et refers to ethyl, and Ph refers to phenyl.

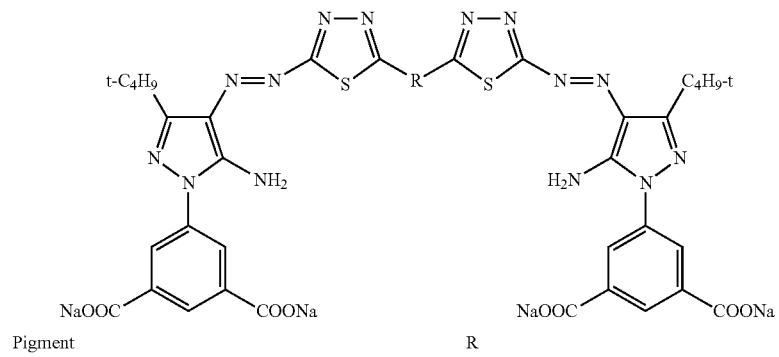

| Pigment | R |
|---|---|
| 1 | —$SCH_2S$— |
| 2 | —$SCH_2CH_2S$— |
| 3 | —$SCH_2CH_2CH_2S$— |
| 4 | —$SCH_2CH_2CH_2CH_2CH_2S$— |
| 5 | —$SCH_2CHS$— with $CH_2$ branch |
| 6 | —$SCH_2CH_2CHS$— with $CH_3$ branch |
| 7 | —$SC_2H_4OC_2H_4S$— |
| 8 | —$SC_2H_4OC_2H_4OC_2H_4S$— |
| 9 | —$SCH_2CHCH_2S$— with OH branch |

-continued

| | |
|---|---|
| 10 | —SCH₂CHS— with CH₂OH substituent |
| 11 | —SCHCH₂S— with COONa substituent |
| 12 | —SCHCH₂CH₂CHS— with two COONa substituents |
| 13 | —SCH—CHS— with two COONa substituents |
| 14 | 1,4-disubstituted cyclohexadiene |
| 15 | 1,3-disubstituted benzene |
| 16 | two m-substituted phenyls linked by —NHCONH— |
| 17 | two p-substituted phenyls linked by —NHCONH— |

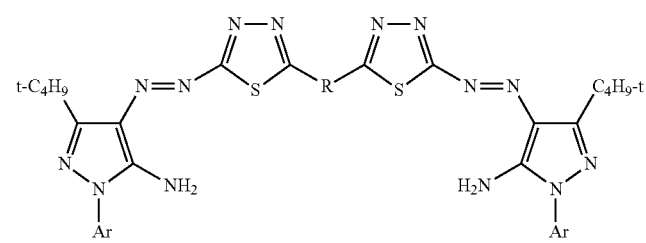

| Pigment | Ar | R |
|---|---|---|
| 18 | 2-methyl-4-COONa-phenyl with additional COONa (NaOOC at 4-position) | —SC₃H₆S— |
| 19 | 3-methyl-phenyl with two COONa groups | —SC₂H₆S— |

-continued
| | | |
|---|---|---|
| 20 | 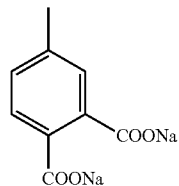 | —SC$_3$H$_6$S— |
| 21 | 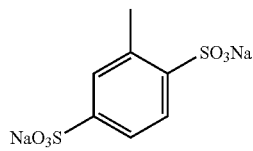 | —SC$_3$H$_6$S— |
| 22 | 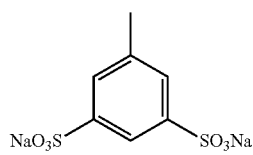 | —SC$_3$H$_6$S— |
| 23 | 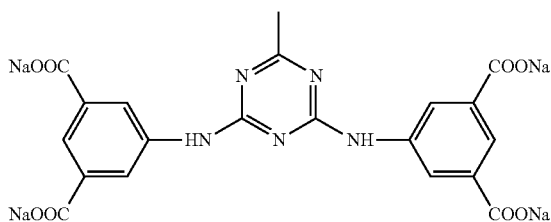 | —SC$_3$H$_6$S— |
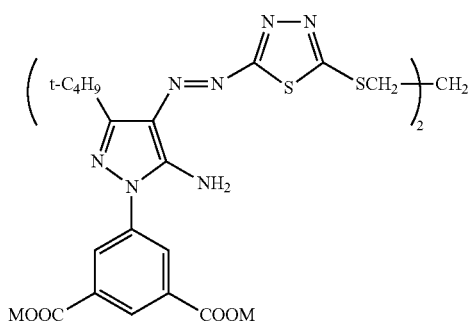
| Pigment | M |
|---|---|
| 24 | K |
| 25 | Li |
| 26 | NH$_4$ |
| 27 | NH(Et)$_3$ |

-continued
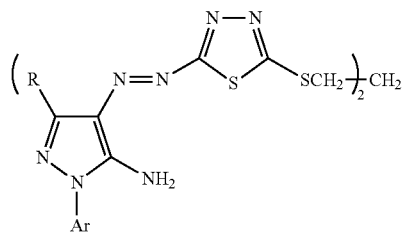
| Pigment | R | Ar |
|---------|---|-----|
| 28 | OEt | 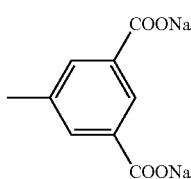 |
| 29 | Ph | 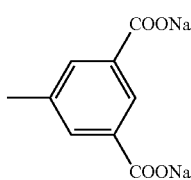 |
| 30 | t-C$_4$H$_9$ | C$_3$H$_6$SO$_3$Na |
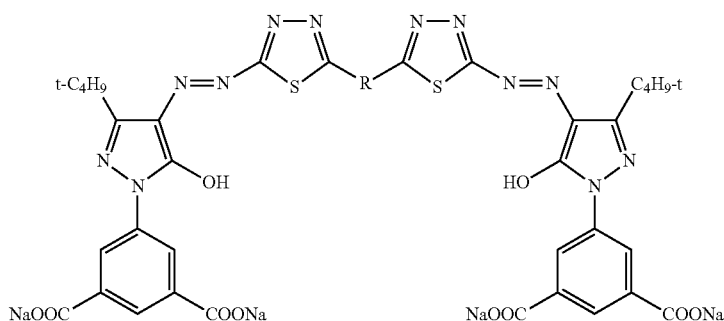
| Pigment | R |
|---------|---|
| 31 | —SCH$_2$CH$_2$S— |
| 32 | —SCH$_2$CH$_2$CH$_2$S— |
| 33 | —SCH$_2$CH$_2$CH$_2$CH$_2$CH$_2$S— |
| 34 | 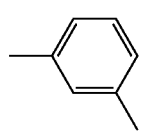 |

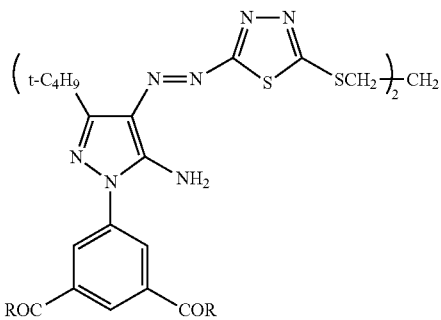

| Pigment | R |
|---|---|
| 35 | 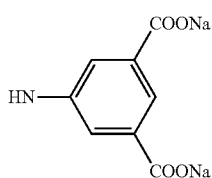 |
| 36 | NHC$_2$H$_4$COONa |
| 37 | 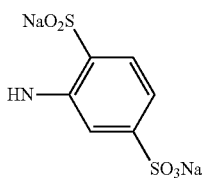 |

The compound represented by Formula (Y-1) can be synthesized by a general synthesis method. For example, as disclosed in JP-A-2004-083903, the compound can be synthesized by changing and variously combining diazo components and coupling components.

The content of the dye (Y-1) is preferably 0.75 mass % to 2.5 mass %, more preferably 1.0 mass % to 2.0 mass %, and further preferably 1.25 mass % to 1.75 mass %, with respect to the total amount of the ink composition. When the content of the dye (Y-1) is within the above range, an image having more excellent color reproducibility can be obtained, and initial filling properties also tend to be excellent.

The ink composition, for adjustment of color tone, may contain a yellow dye other than the above components within the range not greatly deteriorating the characteristics including light resistance.

Components Other than Dye

Hereinafter, other components contained in the ink composition, other than the above-described dye, will be described.

Alkylene Oxide Adduct of Acetylene Glycol Having Main Chain of 12 or More Carbon Atoms, and Acetylene Glycol Having Main Chain of 10 or More Carbon Atoms The ink composition of the present embodiment contains an alkylene oxide adduct of acetylene glycol having a main chain of 12 or more carbon atoms, and acetylene glycol having a main chain of 10 or more carbon atoms. When the ink composition contains an alkylene oxide adduct of acetylene glycol, and acetylene glycol having a main chain of 10 or more carbon atoms, initial filling properties are more improved.

Alkylene Oxide Adduct of Acetylene Glycol Having Main Chain of 12 or More Carbon Atoms The alkylene oxide adduct of acetylene glycol having a main chain of 12 or more carbon atoms (hereinafter, referred to as "acetylene glycol A") is included in an acetylene glycol-based surfactant (non-ionic surfactant) together with acetylene glycol having a main chain of 10 or more carbon atoms, which will be described later. The non-ionic surfactant functions to uniformly spread an ink onto a recording medium. Therefore, when ink jet recording is performed using an ink containing the non-ionic surfactant, a relatively high-resolution image with less bleeding is obtained. The "main chain" in the present specification means a main chain based on the IUPAC nomenclature.

Particularly, the acetylene glycol A, which has a main chain of 12 or more carbon atoms, is excellent in wettability to a polymer member, such as rubber or plastic, constituting an ink flow channel and to a foreign material capable of causing the bubble generation in ink. Therefore, when the acetylene glycol A is used, it is possible to prevent the generated bubbles from remaining on the surface of the ink flow channel of the polymer member from an ink tank to a head. In addition, initial filling properties are improved, and both the growth of the remaining bubbles and the dot missing caused by the separation of bubbles adhered to the surface of the ink flow channel can be prevented, so continuous printing stability becomes good. When the acetylene glycol A is an alkylene oxide adduct, the solubility in the ink becomes excellent.

The HLB (hydrophile-lipophile balance) value of the acetylene glycol A is preferably 8 to 15 in order to make the above wettability more excellent. Here, the HLB value is a HLB value defined by the Griffin method.

The acetylene glycol A is not limited to below, but an example thereof includes a compound represented by Formula (1) below.

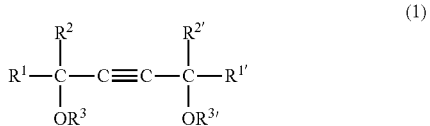

(In the formula (1), $R^1$, $R^{1'}$, $R^2$, and $R^{2'}$ each independently represent an alkyl group having 1 to 5 carbon atoms, the number of carbon atoms in the main chain is 12 or more, —$OR^3$ represents —OH or —$O(C_2H_4O)_mH$, and —$OR^{3'}$ represents —OH or —$O(C_2H_4O)_nH$. In this case, m and n are each independently a value including a small number of 0.5 to 25, and m+n is a value including a small number of 1 to 40 (However, a case that either —$OR^3$ or —$OR^{3'}$ is —OH is excluded).)

Specific examples of the acetylene glycol A include, but are not limited to, ethoxylates of 2,5,8,11-tetramethyl-6-dodecyne-5,8-diol and ethoxylates of 5,8-dimethyl-6-dodecyne-5,8-diol. Among the alkylene oxide adducts of acetylene glycol, an ethylene oxide adduct of acetylene glycol and a propylene oxide adduct of acetylene glycol are preferable, and an ethylene oxide adduct of acetylene glycol is more preferable.

The number of added moles of alkylene oxide units in the acetylene glycol is preferably 1 to 20 moles in each of $R^3$ and $R^{3'}$. The total number of these added moles thereof (sum of $R^3$ and $R^{3'}$) is preferably 2 to 40 moles. When the total number of added moles of alkylene oxide units is 40 or less, static and dynamic surface tensions can be made small, and absorption performance of ink becomes good.

The commercially available product of the acetylene glycol A is not particularly limited, but an example thereof includes OLFINE EXP4300 (trade name, manufactured by Nissin Chemical Industry Co., Ltd., carbon number 12, ethylene oxide adduct).

The acetylene glycol A may be used alone in a combination of two or more kinds thereof.

The content of the acetylene glycol A is preferably 0.25 mass % to 1.75 mass %, more preferably 0.50 mass % to 1.5 mass %, and further preferably 0.75 mass % to 1.25 mass %, with respect to the total amount of the ink composition. When the content of the acetylene glycol A is 0.25 mass % or more, there is tendency to increase the wettability to a hydrophobic surface and improve filling properties. Further, when the content of the acetylene glycol A is 1.75 mass % or less, there is tendency to further improve dissolution stability.

Acetylene Glycol Having Main Chain of 10 or More Carbon Atoms

The acetylene glycol having a main chain of 10 or more carbon atoms (hereinafter, referred to as "acetylene glycol B") can effectively remove the bubbles generated in the ink. Thus, initial filling properties and continuous printing stability become excellent.

The HLB value of the acetylene glycol B is preferably 7 or less, and more preferably 3 to 5, because the acetylene glycol B has excellent defoaming properties.

The acetylene glycol B is not limited to below, but an example thereof includes a compound represented by Formula (2) below.

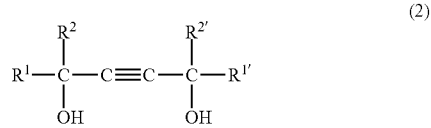

(In the formula (2), $R^1$, $R^{1'}$, $R^2$, and $R^{2'}$ each independently represent an alkyl group having 1 to 5 carbon atoms, and the number of carbon atoms in the main chain is 10 or more. Here the $R^1$, $R^{1'}$, $R^2$, and $R^{2'}$ in the formula (2) have no relationship with the above-described $R^1$, $R^{1'}$, $R^2$, and $R^{2'}$ in the formula (1).)

Specific examples of the acetylene glycol B include, but are not limited to, 2,5,8,11-tetramethyl-6-dodecyne-5,8-diol, 5,8-dimethyl-6-dodecyne-5,8-diol, 2,4,7,9-tetramethyl-5-decyne-4,7-diol, and 4,7-dimethyl-5-decyne-4,7-diol.

The commercially available product of the acetylene glycol B is not particularly limited to below, but examples thereof include SURFYNOL 104PG50 (2,4,7,9-tetramethyl-5-decyne-4,7-diol) and SURFYNOL DF110D (2,5,8,11-tetra-methyl-6-dodecyne-5,8-diol) (all are product names manufactured by Air products and Chemicals, Inc.).

The acetylene glycol B may be used alone in a combination of two or more kinds thereof.

The content of the acetylene glycol B is preferably 0.10 mass % to 1.0 mass %, more preferably 0.25 mass % to 0.75 mass %, and further preferably 0.40 mass % to 0.60 mass %, with respect to the total amount of the ink composition. When the content of the acetylene glycol B is 0.10 mass % or more, there is tendency to increase the wettability to a hydrophobic surface and improve filling properties. Further, when the content of the acetylene glycol B is 1.0 mass % or less, there is tendency to further improve dissolution stability.

The total content of the acetylene glycol A and the acetylene glycol B is preferably 0.75 mass % to 2.25 mass %, more preferably 1.0 mass % to 2.0 mass %, and further preferably 1.25 mass % to 1.75 mass %, with respect to the total amount of the ink composition. When the total content of the acetylene glycol A and the acetylene glycol B is within the above range, the solubility to the ink becomes good, and it is possible to effectively prevent aggregates from being generated at the time of combining these acetylene glycols.

Polyoxyalkylene Alkyl Ether

The ink composition of the present embodiment may contain a polyoxyalkylene alkyl ether. When the ink composition contains the polyoxyalkylene alkyl ether, there is a tendency to further improve the solubility and dispersisbility of the acetylene glycol A and the acetylene glycol B. Further, the polyoxyalkylene alkyl ether hardly affects the low dynamic surface tension of the acetylene glycol A and the acetylene glycol B.

Meanwhile, since a continuous ink supply system (CISS) often uses an ink flow channel or ink tank made of a hydrophobic material, in the ink set used in the continuous ink supply system, each ink effectively uses a relatively hydrophobic surfactant. From this viewpoint, it is effective for the acetylene glycol A and the acetylene glycol B to be used in a combination thereof, but, from the viewpoint of improving dissolution stability, initial filling properties and continuous printing stability while obtaining the effects of the acetylene glycol A and the acetylene glycol B, particularly, when the ink set of the present embodiment is used in a recording apparatus including the continuous ink supply system (CISS), it is preferable that the ink contains the polyoxyalkylene alkyl ether.

Here, the "ink supply system" refers to an ink supply system which includes an ink storage container having an air inlet (ink tank), a print head having nozzles for ejecting the liquid in the ink storage container, and an ink supply channel connecting the ink storage container and the print head and supplying the liquid from the ink storage container to the print head.

Further, the "ink flow channel" refers to a flow channel for circulating the ink in an ink jet recording apparatus. Examples of the ink flow channel include an ink supply channel for supplying the ink from the ink storage container for storing the ink to an ink jet recording head and a flow channel for circulating the ink to the nozzle opening in the ink jet recording head.

The HLB value of the polyoxyalkylene alkyl ether is preferably 11 to 16, and more preferably 12 to 15. When the HLB value of the polyoxyalkylene alkyl ether is within the above range, there is a tendency to further improve initial filling properties and continuous printing stability.

The polyoxyalkylene alkyl ether is not limited to below, but an example thereof includes a compound represented by Formula (3) below. When such a polyoxyalkylene alkyl ether is used, there is a tendency to further improve storage stability and continuous printing stability.

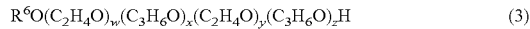
$$R^6O(C_2H_4O)_w(C_3H_6O)_x(C_2H_4O)_y(C_3H_6O)_zH \qquad (3)$$

(In the formula (3), $R^6$ represents an alkyl group having 1 to 20 carbon atoms, preferably an alkyl group having 5 to 15 carbon atoms, and more preferably an alkyl group having 10 to 15 carbon atoms. w is a value of 1 to 20, and x, y, and z are each independently a value of 0 or 1 to 20. w, x, y, and z satisfies 5 w+x+y+z 30, and preferably satisfies 5 w+x+y+z 25.)

The polyoxyalkylene alkyl ether is not particularly limited, but specific examples thereof include $C_{12}H_{25}O(C_2H_4O)_6(C_3H_6O)_2(C_2H_4O)_6(C_3H_6O)_8H$, $C_{13}H_{27}O(C_2H_4O)_6(C_3H_6O)_2(C_2H_4O)_6(C_3H_6O)_8H$, $C_{12}H_{25}O(C_2H_4O)_w(C_3H_6O)_w(C_2H_4O)_y(C_3H_6O)_zH$ (here, w+y=15, x+z=4), $C_{13}H_{27}O(C_2H_4O)_w(C_3H_6O)_x(C_2H_4O)_y(C_3H_6O)_zH$ (here, w+y=15, x+z=4), $C_{12}H_{25}O(C_2H_4O)_8(C_3H_6O)_2(C_2H_4O)_6H$, $C_{13}H_{27}O(C_2H_4O)_8(C_3H_6O)_2(C_2H_4O)_6H$, $C_{12}H_{25}O(C_2H_4O)_{12}(C_3H_6O)_2(C_2H_4O)_{12}H$, $C_{13}H_{27}O(C_2H_4O)_{12}(C_3H_6O)_2(C_2H_4O)_{12}H$, $CH_3(CH_2)_9(CH_3)CHO(C_2H_4O)_7(C_3H_6O)_{4.5}H$, $CH_3(CH_2)_{11}(CH_3)CHO(C_2H_4O)_7(C_3H_6O)_{4.5}H$, $CH_3(CH_2)_9(CH_3)CHO(C_2H_4O)_5(C_3H_6O)_{3.5}H$, $CH_3(CH_2)_{11}(CH_3)CHO(C_2H_4O)_5(C_3H_6O)_{3.5}H$, $C_{14}H_{29}O(C_2H_4O)_{14}(C_3H_6O)_2H$, $C_{11}H_{23}O(C_2H_4O)_8H$, $C_{10}H_{21}O(C_2H_4O)_{11}H$, and $C_{12}H_{25}O(C_2H_4O)_{15}H$.

The commercially available product of the polyoxyalkylene alkyl ether is not particularly limited, but specific examples thereof include NEWCOL 1006 ($C_8H_{17}O(CH_2CH_2O)_nH$, HLB value 14.6, manufactured by Nippon Nyukazai Co., Ltd.), NOIGEN DL-0415 ($R^6O(C_2H_4O)_w(C_3H_6O)_x(C_2H_4O)_y(C_3H_6O)_zH$, "$R^6$": alkyl having 12 or 13 carbon atoms, w+y=15, x+z=4, HLB value 15.0), NOIGEN ET-116B ($R^6O(C_2H_4O)_7(C_3H_6O)_{4.5}H$, "$R^6$": alkyl having 12 or 14 carbon atoms, HLB value 12.0), NOIGEN ET-106A ($R^6O(C_2H_4O)_5(C_3H_6O)_{3.5}H$, "$R^6$": alkyl having 12 or 14 carbon atoms, HLB value 10.9), NOIGEN DH-0300 ($R^6O(C_2H_4O)_2H$, "$R^6$": alkyl having 14 carbon atoms, HLB value 4.0), NOIGEN YX-400 ($R^6O(C_2H_4O)_{40}H$, "$R^6$": alkyl having 12 carbon atoms, HLB value 18.1), NOIGEN EA-160 ($C_9H_{19}C_6H_4O(C_2H_4O)_{16.8}H$, HLB value 15.4) (all were manufactured by DKS Co., Ltd.), and EMULGEN 1108 (trade name manufactured by Kao Corporation, $R^6O(C_2H_4O)_8H$, "$R^6$": alkyl having 11 carbon atoms, HLB value 13.4).

The polyoxyalkylene alkyl ether may be used alone in a combination of two or more kinds thereof.

The content of the polyoxyalkylene alkyl ether is preferably 0.50 mass % to 5.50 mass %, more preferably 1.0 mass % to 5.0 mass %, and further preferably 1.50 mass % to 4.50 mass %, with respect to the total amount of the ink composition. When the content of the polyoxyalkylene alkyl ether is within the above range, there is tendency to improve filling properties, storage stability and continuous printing stability.

The content of the polyoxyalkylene alkyl ether is preferably 1.0 part by mass to 5.0 parts by mass, and more preferably 1.5 parts by mass to 4.5 parts by mass, with respect to 1 part by mass of the content of the acetylene glycol A. When the content of the polyoxyalkylene alkyl ether is within the above range, there is tendency that the acetylene glycol A is sufficiently solubilized to make water solubility good. Therefore, there is a tendency capable of suppressing the generation of aggregates or the occurrence of difference in the absorption of ink at the time of combining the polyoxyalkylene alkyl ether with the acetylene glycol A.

The content of the polyoxyalkylene alkyl ether is preferably 1.0 part by mass to 3.0 parts by mass, and more preferably 1.5 parts by mass to 2.5 parts by mass, with respect to 1 part by mass of the total content of the acetylene glycol A and the acetylene glycol B. When the content of the polyoxyalkylene alkyl ether is within the above range, there is tendency that the acetylene glycol A and the acetylene glycol B are sufficiently solubilized to make water solubility good. Therefore, there is a tendency capable of suppressing the generation of aggregates or the occurrence of difference in the absorption of ink at the time of combining the polyoxyalkylene alkyl ether with the acetylene glycol A and the acetylene glycol B.

Other Surfactants

The ink composition of the present embodiment may contain a surfactant other than the above surfactants. The surfactant is not particularly limited, but an example thereof is preferably at least one of fluorine-based surfactants and silicone-based surfactants. When ink contains this surfactant, drying of ink adhered to a cloth becomes better, and high-speed printing becomes possible.

Among these, a silicone-based surfactant is more preferable because the solubility in the ink increases and the generation of foreign materials in the ink is not easy.

The fluorine-based surfactant is not particularly limited, but examples thereof include perfluoroalkyl sulfonates, perfluoroalkyl carboxylates, perfluoroalkyl phosphate esters, perfluoroalkyl ethylene oxide adducts, perfluoroalkyl betaine, and perfluoroalkyl amine oxide compounds. The commercially available product of the fluorine-based surfactant is not particularly limited, but examples thereof include: S-144 and S-145 (manufactured by Asahi Glass Co., Ltd.); FC-170C, FC-430, and Fluorad-FC4430 (manufactured by Sumitomo 3M Co., Ltd.); FSO, FSO-100, FSN, FSN-100, and FS-300 (manufactured by Dupont Corporation); and FT-250 and 251 (manufactured by Neos Co., Ltd.). The fluorine-based surfactant may be alone or in a combination of two or more kinds thereof.

Examples of the silicone-based surfactant include polysiloxane-based compounds and polyether-modified organosiloxanes. The commercially available product of the silicone-based surfactant is not particularly limited, but specific examples thereof include BYK-306, BYK-307, BYK-333, BYK-341, BYK-345, BYK-346, BYK-347, BYK-348, and BYK-349 (all are trade names manufactured by BYK Japan K.K.); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all are trade names manufactured by Shin-Etsu Chemical Co., Ltd.).

Solvent

The ink composition may contain a solvent. The solvent is not particularly limited. For example, an organic solvent or water can be used as the solvent.

Examples of the water include pure water and ultrapure water, such as ion-exchange water, ultrafiltered water, reverse osmosis water, and distilled water, which were prepared by removing ionic impurities as much as possible. Further, when water sterilized by ultraviolet irradiation or addition of hydrogen peroxide is used, it is possible to prevent the generation of fungi or bacteria in the case of long-term storage of ink. Therefore, there is a tendency to further improve storage stability.

As the organic solvent, a volatile water-soluble organic is more preferable. The organic solvent is not particularly limited, but specific examples thereof include alcohols or glycols, such as glycerin, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol monobutyl-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol; N,N-dimethylformamide; N,N-dimethylacetamide; 2-pyrrolidone; N-methyl-2-pyrrolidone; 2-oxazolidone; 1,3-dimethyl-2-imidazolidinone; dimethyl sulfoxide; sulfolane; and 1,1,3,3-tetramethylurea.

The solvent may be alone or in a combination of two or more kinds thereof. The content of the organic solvent is not particularly limited, and may be determined appropriately as required. From the viewpoint of improving the compatibility with the polyoxyethylene alkyl ether, triethylene glycol alkyl ether, such as triethylene glycol monobutyl ether, is preferable.

The content of the triethylene glycol alkyl ether is preferably 3.0 mass % to 15 mass %, more preferably 3.0 mass % to 12.5 mass %, and further preferably 3.0 mass % to 10 mass %. When the content of the triethylene glycol alkyl ether is within the above range, there is a tendency to further suppress the ejection failure due to the separation of the surfactant in the ink jet head nozzle.

The mass ratio of the triethylene glycol alkyl ether to the polyoxyalkylene alkyl ether is preferably 1.5 or more, more preferably 1.75 or more, and further preferably 2 or more. The upper limit of the mass ratio of the triethylene glycol alkyl ether to the polyoxyalkylene alkyl ether is not particularly limited, but is preferably 10 or less. When the mass ratio of the triethylene glycol alkyl ether to the polyoxyalkylene alkyl ether is within the above range, there is a tendency to further suppress the ejection failure due to the separation of the surfactant in the ink jet head nozzle.

pH Adjuster

The ink composition used in the present embodiment may contain a pH adjuster. The pH adjuster can easily adjust the pH value of ink. The pH adjuster is not particularly limited, but examples thereof include inorganic acids (e.g., sulfuric acid, hydrochloric acid, nitric acid, and the like), inorganic bases (e.g., lithium hydroxide, sodium hydroxide, potassium hydroxide, ammonia, and the like), organic bases (e.g., triethanolamine, diethanolamine, monoethanolamine, tripropanolamine, and the like), and organic acids (e.g., adipic acid, citric acid, succinic acid, and the like). The pH adjuster may be alone or in a combination of two or more kinds thereof.

Other Components

The ink composition used in the present embodiment can appropriately contain various additives, such as a dissolution aid, a viscosity modifier, a pH adjuster, an antioxidant, a preservative, a fungicide, a corrosion inhibitor, and a chelating agent for capturing metal ions influencing dispersion, for the purpose of maintaining good storage stability and good ejection stability from a head, preventing clogging, or preventing the deterioration of ink.

Dynamic Contact Angle

The dynamic contact angle of the ink composition of the present embodiment to a silicon wafer is preferably 24° or less, more preferably 22° or less, and further preferably 20° or less, in 100 msec after dropping. Further, the contact angle of the ink composition of the present embodiment to a silicon wafer is preferably 9° or less, more preferably 7° or less, and further preferably 5° or less, in 5100 msec after dropping. When the dynamic contact angle of the ink composition to a silicon wafer is within the above range, the filling properties of an ink jet printer are further improved. The dynamic contact angle thereof can be measured by the methods described in Examples.

Hue Angle

The hue angle of the ink composition is preferably 32.5° to 42.5°, and more preferably 35° to 40°. When the hue angle of the ink composition is within the above range, The ink composition of the present embodiment is a so-called red ink, and the color reproducibility of the recorded product obtained by combination with another color ink composition tends to be further improved.

Ink Set

The ink set of the present embodiment includes the above-described ink composition; and at least one selected from the group consisting of a yellow ink composition, a magenta ink composition, a cyan ink composition, and a black ink composition. When such an ink set is used, there is a tendency that the color reproducibility of the obtained recorded product is further improved. The yellow ink composition, magenta ink composition, cyan ink composition, and black ink composition are not particularly limited as long as they contain yellow pigment, magenta pigment, cyan pigment, and black pigment known in the related art, respectively.

Examples

Hereinafter, the invention will be described in detail using Examples and Comparative Examples. The invention is not limited to the following Examples.

Materials for Red Ink Composition

Main materials for the red ink compositions used in the following Examples and Comparative Examples are as follows.

Color Materials
Dye (M-2): refer to below
Dye (M-1): refer to below
Dye (Y-1): refer to below
Dye (Y-2-1): C. I. Direct Yellow 86

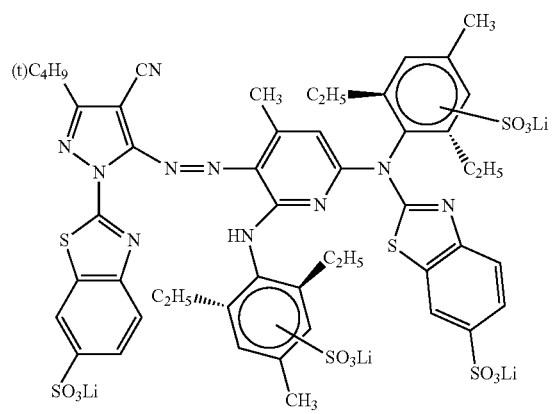

M-2

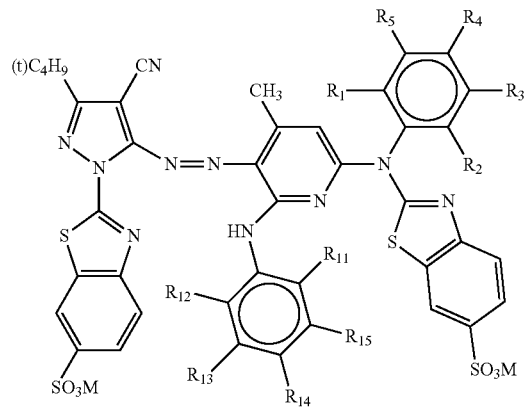

M-2 (General Formula)

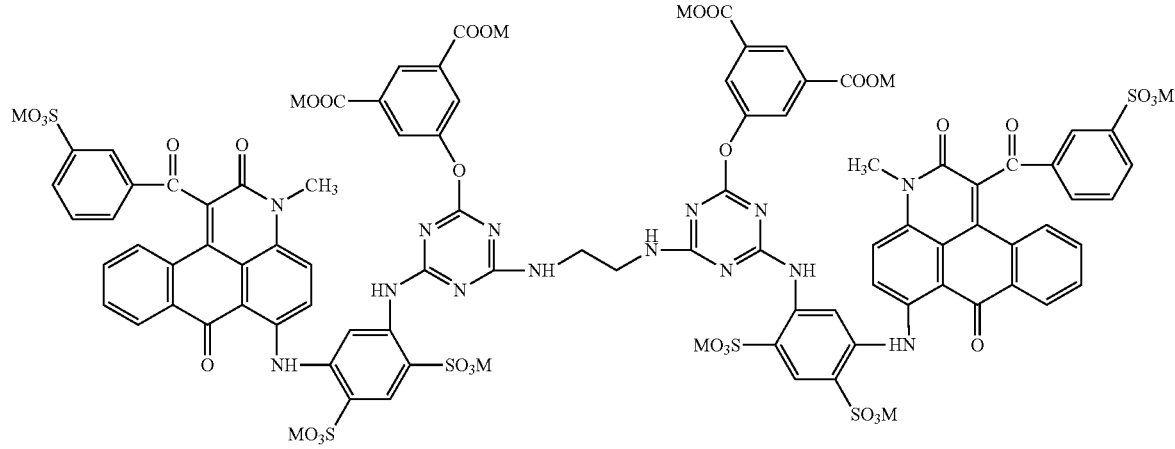

M-1

M = Na or $NH_4$

-continued

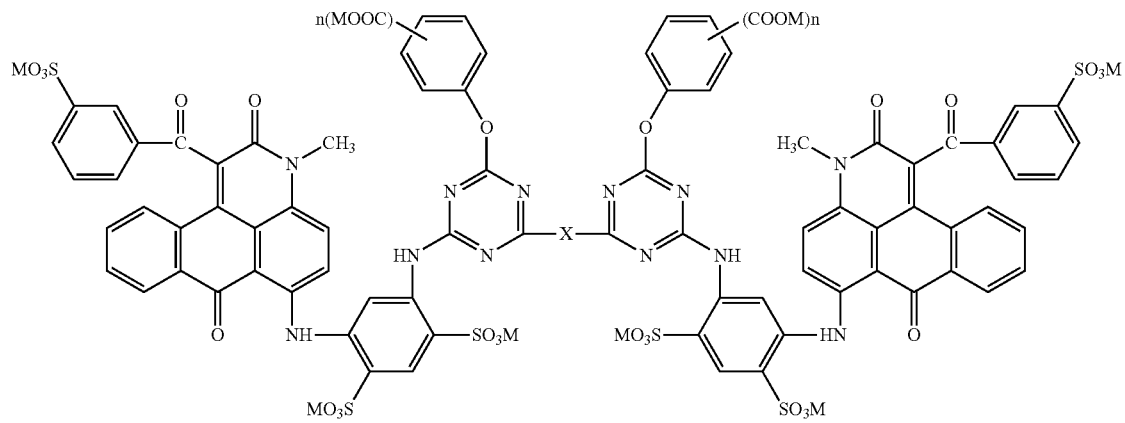

M-1 (General Formula)

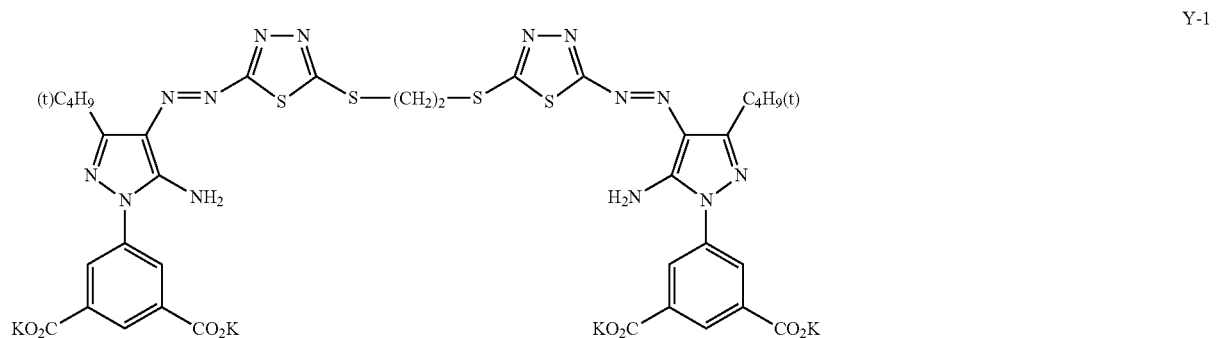

Y-1

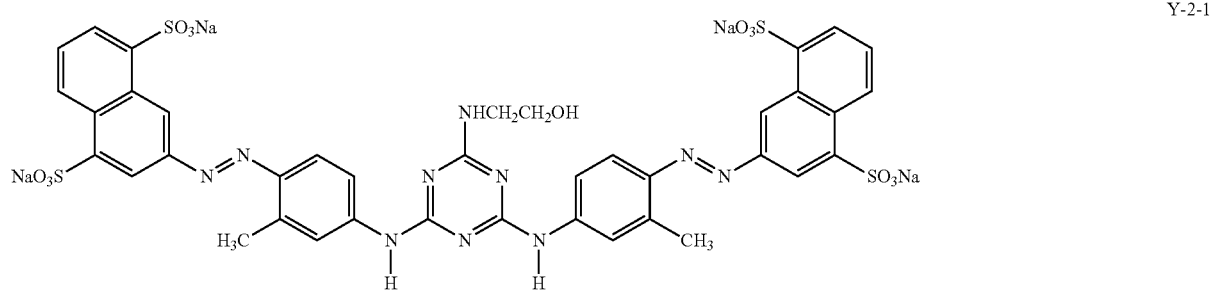

Y-2-1

Surfactants

OLFINE E1010: the number of carbon atoms in the main chain 10, the number of added moles of ethylene oxide 10, HLB 13 to 14, manufactured by Nissin Chemical Industry Co., Ltd.

SURFYNOL 104PG50: the number of carbon atoms in the main chain 10, ethylene oxide non-added, HLB 4, manufactured by Air products and Chemicals, Inc.

NEWCOL 1006: polyoxyalkylene alkyl ether, manufactured by Nippon Nyukazai Co., Ltd.

Solvents
Triethylene glycol monobutyl ether
Glycerin
Triethylene glycol pH adjuster
Triethanolamine Preparation of Ink Composition Materials were respectively mixed in the composition ratios given in Table 2 below, and sufficiently stirred to obtain ink compositions, respectively. In Table 1 below, the unit of numerical value is mass %, and the total is 100.0 mass %.

Yellow, magenta, cyan, and black ink compositions Each ink composition ratio was adjusted in the same manner as red ink in the composition ratios of Table 1 using the following color materials.

Color Material of Yellow Ink
Y-1 (above described)

Y-2
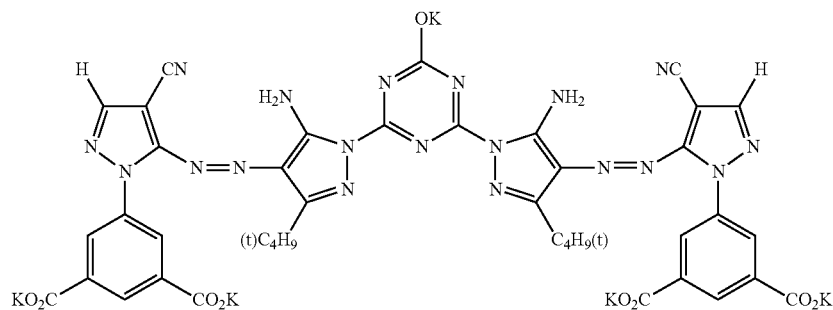
Color Material of Magenta Ink
M-1 (above described)
M-2 (above described)
M-3: Reactive Red 141
Color Material of Cyan Ink
C-1
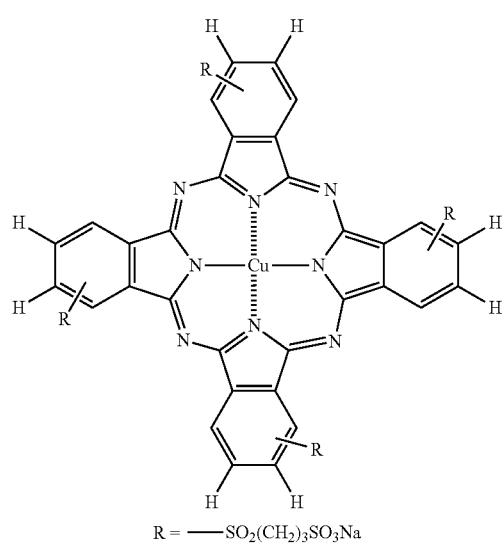
R = —SO$_2$(CH$_2$)$_3$SO$_3$Na
-continued
C-2
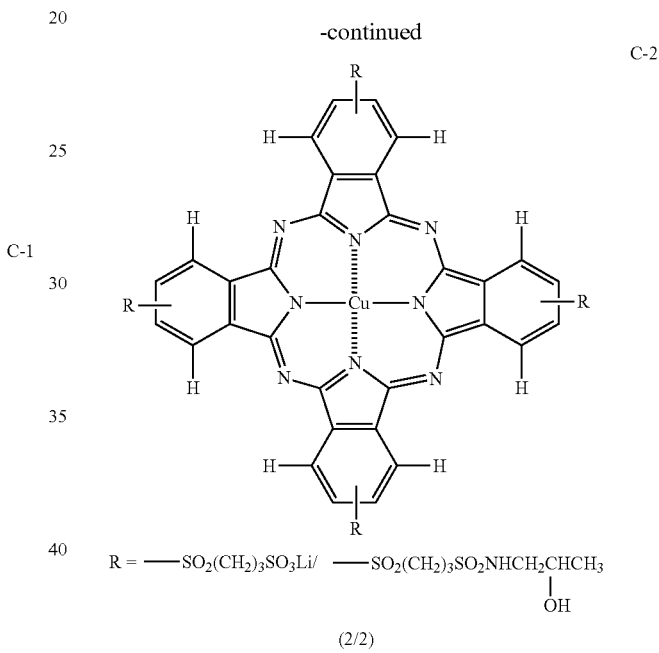
R = —SO$_2$(CH$_2$)$_3$SO$_3$Li/ —SO$_2$(CH$_2$)$_3$SO$_2$NHCH$_2$CHCH$_3$
                                                              |
                                                              OH
(2/2)
Color Material of Black Ink
Bk-1
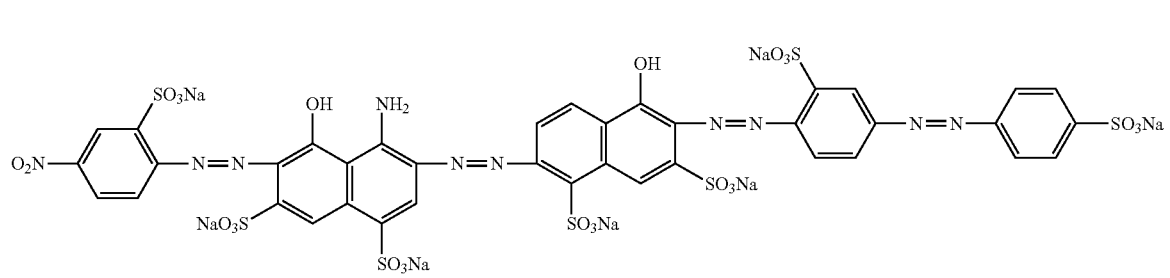

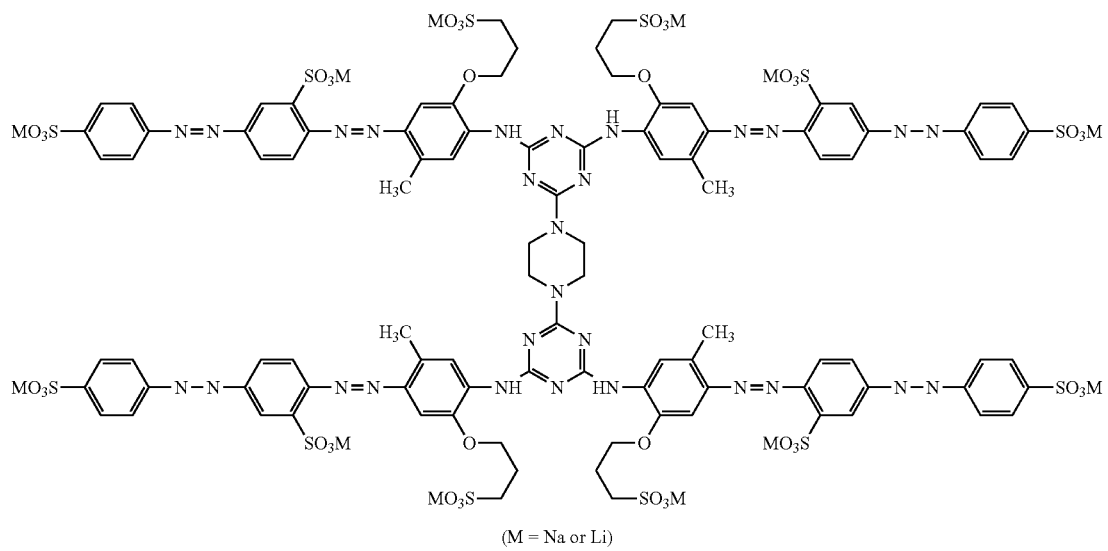

(M = Na or Li)

| Components | Yellow ink | Magenta ink | Cyan ink | Black ink |
|---|---|---|---|---|
| Y-1 | 2.0 | | | |
| Y-2 | 2.0 | | | |
| M-1 | | 3.0 | | |
| M-2 | | 1.0 | | |
| M-3 | | 1.0 | | |
| C-1 | | | 0.4 | |
| C-2 | | | 3.6 | |
| Bk-1 | | | | 4.0 |
| Bw-1 | | | | 1.0 |
| SAA1 | 0.3 | 0.15 | 0.1 | 0.3 |
| SAA3 | 0.15 | 0.15 | 0.15 | 0.1 |
| POAAE1 | 0.15 | 0.15 | 0.15 | 0.15 |
| Triethylene glycol | 10 | 10 | 10 | 10 |
| Triethylene glycol monobutyl ether | 8 | 8 | 8 | 8 |
| Propylene glycol | 1 | 1 | 1 | 1 |
| Dipropylene glycol | 1 | 1 | 1 | 1 |
| Glycerin | 10 | 10 | 10 | 10 |
| Triethanolamine | 0.5 | 0.5 | 0.5 | 0.5 |
| Water | balance | balance | balance | balance |
| Total | 100 | 100 | 100 | 100 |

The above surfactants are as follows.

SAA1: OLFINE EXP4300: the number of carbon atoms in the main chain 12, ethylene oxide added, 2,5,8,11-tetramethyl-6-dodecyne-5,8-diol ethoxylate (manufactured by Nissin Chemical Co., Ltd.)

SAA3: SURFYNOL 104PG50: the number of carbon atoms in the main chain 10, ethylene oxide non-added, 2,4,7,9-tetramethyl-5-decyne-4,7-diol (trade name manufactured by Air products and Chemicals, Inc.)

POAAE1: NOIGEN DL-0415 (manufactured by DKS Co., Ltd.); polyoxyalkylene alkyl ether Hue Angle The ink tank of an ink jet printer (EP-805A [product name], manufactured by SEIKO EPOSON CORPORATION) was filled with each of the prepared ink compositions, and a recorded product of Duty 100% was created on a recording medium (photo paper <gloss>, manufactured by SEIKO EPOSON CORPORATION). The hue angle of the resulting recorded product (L*,a*,b*) was measured using a spectrophotometer (Spectrolino, trade name, manufactured by Gretag Macbeth Inc.). The measurement thereof was carried out under conditions of light source D50 and viewing angle of 2°. For white standards, an indicator-attached spectrophotometer (DIN5033) was used. The measurement data of patch near a L* value of 50 is given in Table 1.

Dynamic Contact Angle 0.5 μL of the ink composition was dropped onto a silicon wafer, and the contact angle of the ink composition after 100 ms and 5100 ms from the time when the ink composition was adhered to the silicon wafer was measured using the PCA-1 (manufactured by Kyowa Interface Science Co., Ltd.). The measurement thereof was carried out under a condition of a humidity of 50% at 25° C. Meanwhile, when the contact angle of ion-exchange water to the silicon wafer was measured under the same measurement condition of dynamic surface tension as the measurement condition of the ink composition, the contact angle of ion-exchange water to the silicon wafer was 77° in 100 msec and 75° in 5100 msec.

TABLE 2

| | | Examples | | | | | Comparative Examples | | | | | | |
|---|---|---|---|---|---|---|---|---|---|---|---|---|---|
| | | 1 | 2 | 3 | 4 | 5 | 1 | 2 | 3 | 4 | 5 | 6 | 7 |
| Color material | Dye (M-2) | 4.50 | 2.67 | 6.40 | 4.50 | 4.50 | 1.50 | 5.83 | | 4.50 | | 4.50 | 4.50 |
| | Dye (M-1) | | | | | | | | 4.50 | | 4.50 | | |
| | Dye (Y-1) | 1.50 | 1.33 | 1.60 | 1.50 | 1.50 | 1.50 | 1.17 | | | 1.50 | 1.50 | 1.50 |
| Dye | (Y-2-1) | | | | | | | 1.50 | 1.50 | | | | |

TABLE 2-continued

| | | Examples | | | | | Comparative Examples | | | | | | |
|---|---|---|---|---|---|---|---|---|---|---|---|---|---|
| | | 1 | 2 | 3 | 4 | 5 | 1 | 2 | 3 | 4 | 5 | 6 | 7 |
| surfactant | OLFINE EXP4300 | 1.00 | 1.00 | 1.00 | 1.00 | 1.00 | 1.00 | 1.00 | 1.00 | 1.00 | 1.00 | 1.00 | |
| | SURFYNOL 104PG50 | 0.50 | 0.50 | 0.50 | 0.50 | 0.50 | 0.50 | 0.50 | 0.50 | 0.50 | 0.50 | 0.50 | |
| | NEWCOL 1006 | 3.00 | 3.00 | 3.00 | 3.00 | 3.00 | 3.00 | 3.00 | 3.00 | 3.00 | | | 3.00 |
| solvent | Triethylene glycol monobutyl ether | 6.00 | 6.00 | 6.00 | 6.00 | 6.00 | 6.00 | 6.00 | 6.00 | 6.00 | 6.00 | 6.00 | 6.00 |
| | Glycerin | 10.00 | 10.00 | 10.00 | 10.00 | 10.00 | 10.00 | 10.00 | 10.00 | 10.00 | 10.00 | 10.00 | 10.00 |
| | Triethylene glycol | 10.00 | 10.00 | 10.00 | 10.00 | 10.00 | 10.00 | 10.00 | 10.00 | 10.00 | 10.00 | 10.00 | 10.00 |
| pH adjuster | Triethanolamine | 0.50 | 0.50 | 0.50 | 0.50 | 0.50 | 0.50 | 0.50 | 0.50 | 0.50 | 0.50 | 0.50 | 0.50 |
| | Water | Balance | Balance | Balance | Balance | Balance | Balance | Balance | Balance | Balance | Balance | Balance | Balance |
| | Total | 100.00 | 100.00 | 100.00 | 100.00 | 100.00 | 100.00 | 100.00 | 100.00 | 100.00 | 100.00 | 100.00 | 100.00 |
| Ink parameter | Hue angle h, printing duty 100% | 37° | 40° | 35° | 37° | 37° | 50° | 0° | 30° | 32° | 30° | 37° | 37° |
| | Dynamic contact angle to silicon wafer in 100 msec after dropping | 20 | 20 | 20 | 20 | 20 | 20 | 20 | 20 | 20 | 20 | 27 | 25 |
| | Dynamic contact angle to silicon wafer in 5100 msec after dropping | 5 | 5 | 5 | 5 | 5 | 5 | 5 | 5 | 5 | 5 | 13 | 10 |
| Performance | Color reproducibility (Gamut volume) | A | B | A | A | A | C | C | C | C | C | A | A |
| | Initial filling properties | A | A | A | B | A | A | A | A | A | A | C | C |

Color Reproducibility (Gamut Volume)

Ink set A including each of the prepared red ink compositions, the above-described yellow ink composition, the above-described magenta ink composition, the above-described cyan ink composition, and the above-described black ink composition, and ink set B not including a red ink composition were prepared. The ink tank of an ink jet printer (EP-805A [product name], manufactured by SEIKO EPOSON CORPORATION) was filled with each of the ink sets, and a color chart image was printed on a recording medium (photo paper <gloss>, manufactured by SEIKO EPOSON CORPORATION). The L* value, a* value, and b* value of the obtained reference color chart image were measured using a colorimeter (trade name "Xrite i1", manufactured by Xrite Inc.). L*a*b* color reproduction range volume value (Gamut value) was calculated from these values.

A: The color reproduction range of the recorded product obtained by the ink set A is increased by 10% or more with respect to the color reproduction range (Gamut volume) of the recorded product obtained by the ink set B.

B: The color reproduction range of the recorded product obtained by the ink set A is increased by 5% or more and less than 10% with respect to the color reproduction range (Gamut volume) of the recorded product obtained by the ink set B.

C: The color reproduction range of the recorded product obtained by the ink set A is increased by less than 5% with respect to the color reproduction range (Gamut volume) of the recorded product obtained by the ink set B.

Initial Filling Properties

The ink cartridge of an ink jet printer (EP-805A [product name], manufactured by SEIKO EPOSON CORPORATION) was filled with each of the prepared ink compositions. The initial filling operation to a head was carried out according to the initial filling sequence set by the EP-805A. Thereafter, nozzle checking was carried out in order to confirm whether ink can be ejected from all nozzles of the head. When nozzles incapable of ejecting the ink exist, the cleaning of the head (suction of the ink in the nozzles) was carried out, and then the nozzle checking was carried out again. Based on the number of cleanings required for ejecting the ink from all the nozzles, initial filling properties were evaluated by the following evaluation criteria.

Evaluation Criteria

A: the ink is ejected from all the nozzles only by the initial filling sequence.

B: the number of cleanings required for ejecting the ink from all the nozzles is one.

C: the number of cleanings required for ejecting the ink from all the nozzles is two or more. The entire disclosure of Japanese Patent Application No. 2015-45214, filed Mar. 6, 2015 is expressly incorporated by reference herein.

What is claimed is:

1. An ink composition, comprising:
a dye (M-2) represented by Formula (M-2);
a dye (Y-1) represented by Formula (Y-1);
an alkylene oxide adduct of acetylene glycol having a main chain of 12 or more carbon atoms;
acetylene glycol having a main chain of 10 or more carbon atoms; and
a polyoxyalkylene alkyl ether,
wherein the content ratio A of the dye (M-2) and the dye (Y-1) (the dye (M-2): the dye (Y-1)) is 1.25:1 to 4.75:1;

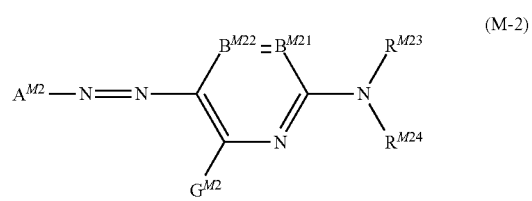

wherein in the formula (M-2), $A^{M2}$ represents a 5-membered heterocyclic group; each of $B^{M21}$ and $B^{M22}$ represents —$CR^{M21}$= or —$CR^{M22}$=, or any one of $B^{M21}$ and $B^{M22}$ represents a nitrogen atom and the other thereof represents —$CR^{M21}$= or —$CR^{M22}$=; $R^{M23}$ and $R^{M24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and may further have a substituent; $G^{M2}$, $R^{M21}$, and $R^{M22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, carbamoyloxy group, heterocyclic oxy group, an alkoxycarbonyloxy group, an aryloxycarbonyloxy group, an amino group substituted with an alkyl group, aryl group or heterocyclic group, an acylamino group, a ureido group, a sulfamoylamino group, an alkoxycarbonylamino group, an aryloxycarbonylamino group, an alkyl- or aryl-sulfonylamino group, a nitro group, an alkyl- or aryl-thio group, an alkyl- or aryl-sulfonyl group, an alkyl- or aryl-sulfinyl group, a sulfamoyl group, a sulfo group, or a heterocyclic thio group, and may be further substituted; and $R^{M21}$ and $R^{M23}$ or $R^{M23}$ and $R^{M24}$ may be bound to form a 5- or 6-membered ring;

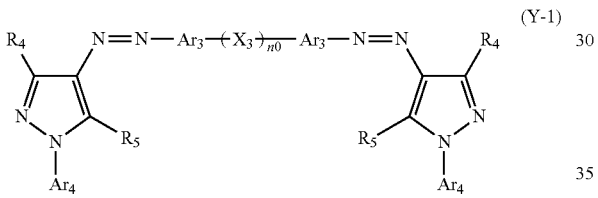

wherein in the formula (Y-1), $R_4$ represents a substituent; $R_5$ represents —$OR_6$ or —$NHR_7$ wherein each of $R_6$ and $R_7$ represents a hydrogen atom or a substituent; $X_3$ represents a divalent linking group; n0 is 0 or 1; $Ar_3$ represents a divalent heterocyclic group; and $Ar_4$ represents an alkyl group, an aryl group, or a triazine group.

2. The ink composition according to claim 1, wherein the dynamic contact angle of the ink composition to a silicon wafer is 24° or less in 100 msec after dropping, and is 9° or less in 5100 msec after dropping.

3. The ink composition according to claim 1, further comprising: a triethylene glycol alkyl ether.

4. The ink composition according to claim 3, wherein the mass ratio of the triethylene glycol alkyl ether to the polyoxyalkylene alkyl ether is 2 or more.

5. The ink composition according to claim 1, wherein the content of the polyoxyalkylene alkyl ether is 1.0 mass % to 5.0 mass %.

6. The ink composition according to claim 3, wherein the content of the triethylene glycol alkyl ether is 3.0 mass % to 15 mass %.

7. The ink composition according to claim 3, wherein the triethylene glycol alkyl ether includes a triethylene glycol monobutyl ether.

8. The ink composition according to claim 1, wherein the total content of the dye (M-2) and the dye (Y-1) is 2.0 mass % to 10.0 mass %.

9. An ink set, comprising:
the ink composition according to claim 1; and
at least one selected from the group consisting of a yellow ink composition, a magenta ink composition, a cyan ink composition, and a black ink composition.

10. An ink set, comprising:
the ink composition according to claim 2; and
at least one selected from the group consisting of a yellow ink composition, a magenta ink composition, a cyan ink composition, and a black ink composition.

11. An ink set, comprising:
the ink composition according to claim 3; and
at least one selected from the group consisting of a yellow ink composition, a magenta ink composition, a cyan ink composition, and a black ink composition.

12. An ink set, comprising:
the ink composition according to claim 4; and
at least one selected from the group consisting of a yellow ink composition, a magenta ink composition, a cyan ink composition, and a black ink composition.

13. An ink set, comprising:
the ink composition according to claim 5; and
at least one selected from the group consisting of a yellow ink composition, a magenta ink composition, a cyan ink composition, and a black ink composition.

14. An ink set, comprising:
the ink composition according to claim 6; and
at least one selected from the group consisting of a yellow ink composition, a magenta ink composition, a cyan ink composition, and a black ink composition.

15. An ink set, comprising:
the ink composition according to claim 7; and
at least one selected from the group consisting of a yellow ink composition, a magenta ink composition, a cyan ink composition, and a black ink composition.

16. An ink set, comprising:
the ink composition according to claim 8; and
at least one selected from the group consisting of a yellow ink composition, a magenta ink composition, a cyan ink composition, and a black ink composition.

* * * * *